(12) United States Patent
Nagai et al.

(10) Patent No.: US 11,407,480 B2
(45) Date of Patent: Aug. 9, 2022

(54) FLOAT ASSEMBLY

(71) Applicant: KYORAKU CO., LTD., Kyoto (JP)

(72) Inventors: Hirofumi Nagai, Osaka (JP);
Yasunobu Ueda, Osaka (JP); Tsutomu Sakaguchi, Osaka (JP)

(73) Assignee: KYORAKU CO., LTD., Kyoto (JP)

( * ) Notice: Subject to any disclaimer, the term of this patent is extended or adjusted under 35 U.S.C. 154(b) by 21 days.

(21) Appl. No.: 16/962,298

(22) PCT Filed: Jan. 23, 2019

(86) PCT No.: PCT/JP2019/002064
§ 371 (c)(1),
(2) Date: Jul. 15, 2020

(87) PCT Pub. No.: WO2019/155883
PCT Pub. Date: Aug. 15, 2019

(65) Prior Publication Data
US 2020/0369350 A1    Nov. 26, 2020

(30) Foreign Application Priority Data

Feb. 7, 2018 (JP) .............................. JP2018-020500
Aug. 8, 2018 (JP) .............................. JP2018-149615

(51) Int. Cl.
*B63B 35/44*   (2006.01)
*H02S 10/40*   (2014.01)

(52) U.S. Cl.
CPC .............. *B63B 35/44* (2013.01); *H02S 10/40* (2014.12); *B63B 2035/4453* (2013.01)

(58) Field of Classification Search
CPC .. B63B 35/44; B63B 2035/4453; H02S 10/40
See application file for complete search history.

(56) References Cited

U.S. PATENT DOCUMENTS

| 5,299,964 A * | 4/1994 | Hopkins | ................. B63B 21/58 114/346 |
| 2014/0224165 A1 * | 8/2014 | Veloso | .................... H02S 20/00 114/267 |

(Continued)

FOREIGN PATENT DOCUMENTS

| CN | 205961037 U | 2/2017 |
| EP | 2 058 222 A1 | 5/2009 |

(Continued)

OTHER PUBLICATIONS

International Search Report dated Feb. 26, 2019 of corresponding International Application No. PCT/JP2019/002064; 5 pgs.

(Continued)

*Primary Examiner* — S. Joseph Morano
*Assistant Examiner* — Jovon E Hayes
(74) *Attorney, Agent, or Firm* — Maier & Maier, PLLC

(57) ABSTRACT

The present invention has been made in view of the foregoing, and an object thereof is to provide a float assembly that is configured to be rotatable and that defines a rotation axis without constructing the expensive pillar.
The present invention provides a float assembly configured to float on water, comprising: a shaft wire extending from substantially a center of the float assembly toward underwater and configured to maintain tension, wherein the float assembly is moored by the shaft wire and configured to be rotatable.

16 Claims, 19 Drawing Sheets

(56) References Cited

U.S. PATENT DOCUMENTS

| | | | | |
|---|---|---|---|---|
| 2017/0085214 A1* | 3/2017 | Niimi | ...................... | B63B 35/38 |
| 2017/0218919 A1* | 8/2017 | Wong | ..................... | F03D 7/0204 |
| 2018/0022426 A1* | 1/2018 | Siegmann | ............... | F24S 20/70 |
| | | | | 114/264 |
| 2019/0341877 A1 | 11/2019 | Niimi | | |
| 2020/0369350 A1* | 11/2020 | Nagai | ..................... | B63B 35/38 |

FOREIGN PATENT DOCUMENTS

| | | | |
|---|---|---|---|
| JP | 2000159188 A | | 6/2000 |
| JP | 2002160692 A | | 6/2002 |
| JP | 2004176626 A | | 6/2004 |
| JP | 2006160025 A | * | 6/2006 |
| JP | 2006160025 A | | 6/2006 |
| JP | 2013089844 A | | 5/2013 |
| JP | 2014-511043 A | | 5/2014 |
| JP | 2015-217771 A | | 12/2015 |
| JP | 2017521597 A | | 8/2017 |
| KR | 101813053 B1 | | 12/2017 |
| WO | 2016143953 A2 | | 9/2016 |

OTHER PUBLICATIONS

Extended European Search Report dated Mar. 24, 2021, in connection with corresponding EP Application No. 19750490.5; 10 pages.
Office Action dated Feb. 21, 2022 in corresponding Chinese Application No. 201980004794.X; 22 pages including English-language translation.

* cited by examiner

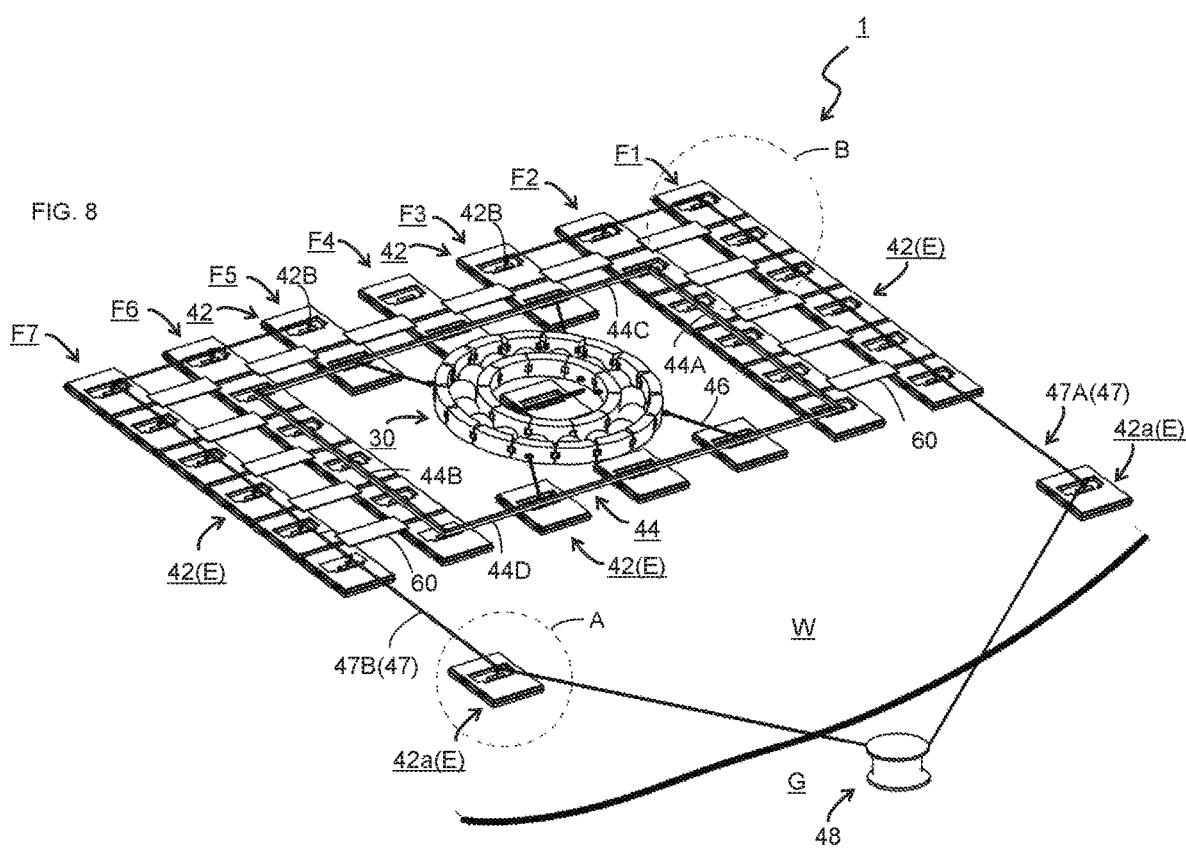

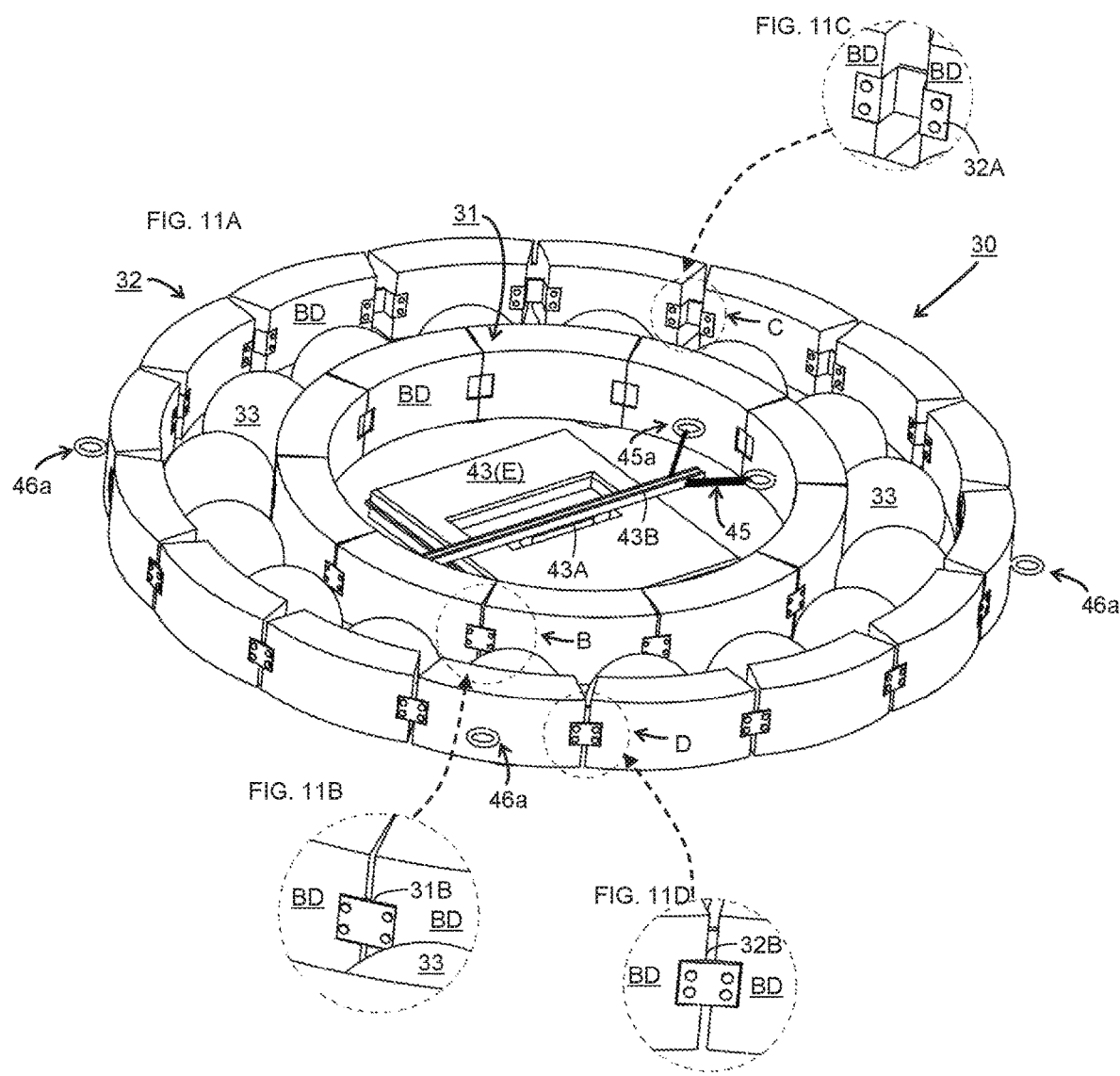

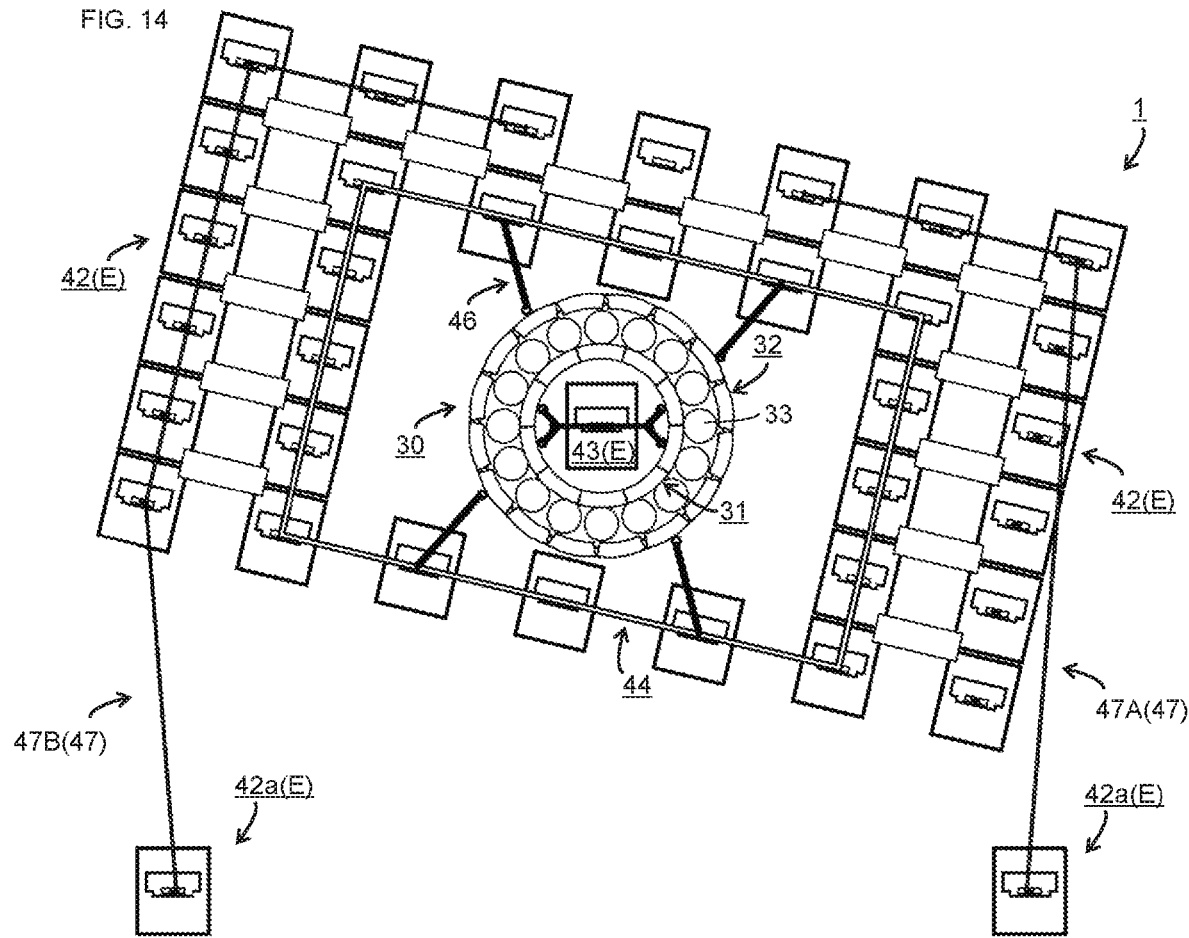

FLOAT ASSEMBLY

TECHNICAL FIELD

The present invention relates to a float assembly.

BACKGROUND ART

Solar panels (also called solar cell panels or solar cell modules) as photoelectric conversion devices are used for solar power generation devices that convert sunlight into electric power. Solar panels are mainly installed on the roofs, walls, and grounds of buildings. And in recent years, they have also been installed on the water of idle ponds and lakes.

When installing solar panels on the water, floats for floating the solar panels on the water are used, and the solar panels are installed on the float (See Patent Literatures 1 and 2).

CITATION LIST

Patent Literature

[Patent Literature 1] Japanese Translation of PCT International Application Publication No. JP-T-2014-511043
[Patent Literature 2] Japanese Unexamined Patent Application Publication No. 2015-217771

SUMMARY OF INVENTION

Technical Problem

By the way, it is considered that the power generation efficiency is improved by slowly rotating, according to the position of the sun, the float assembly formed by connecting the floats with each other. When rotating, a rotation axis fixed at the center is required to avoid translational movement of the float assembly. That is, as such a rotation axis, it is necessary to fix a rigid body such as a pillar to the bottom of the water and extend it toward the water surface. However, such pillar requires huge cost.

The present invention has been made in view of the foregoing, and an object thereof is to provide a float assembly that is configured to be rotatable and that defines a rotation axis without constructing the expensive pillar.

The present invention provides a float assembly configured to float on water, comprising: a shaft wire extending from substantially a center of the float assembly toward underwater and configured to maintain tension, wherein the float assembly is moored by the shaft wire and configured to be rotatable.

The float assembly of the present invention is moored by the shaft wire and configured to be rotatable, and the shaft wire is configured to maintain the tension. Thus, the float assembly realizes a rotation axis fixed to the center of the float assembly without constructing the expensive pillar. In other words, the float assembly defines the rotation axis without constructing the expensive pillar.

Various embodiments of the present invention are described below. Any of the embodiments described below can be combined with one another.

Preferably, a normal float including a plurality of floats connected to one another; and a rotation center float moored by the shaft wire, wherein the normal float is configured to independently rotate around the rotation center float.

Preferably, the rotation center float further includes a first tension generating mechanism, the shaft wire includes one end fixed in the underwater, and the first tension generating mechanism is configured to pull the shaft wire to maintain the tension of the shaft wire.

Preferably, the first tension generating mechanism is a first winch configured to wind the shaft wire.

Preferably, a facilitation mechanism provided at a boundary between the normal float and the rotation center float.

Preferably, the rotation center float is provided on a side of a bottom of the water than the normal float.

Preferably, a water level sensor, wherein the float assembly is configured to adjust length and the tension of the shaft wire based on a water level detected by the water level sensor.

Preferably, a rotation wire, wherein the rotation wire is configured to connect a rotation float to a land, the rotation float is a part of the float assembly, and the float assembly is configured to rotate when the rotation wire is pulled.

Preferably, the float assembly has a rectangular shape as a whole, the rotation float is located at an apex of the rectangular shape, a second tension generating mechanism configured to pull the rotation wire is provided in at least one of the rotation float and the land, the float assembly is configured to rotate when the rotation wire is pulled by the second tension generating mechanism.

Preferably, the second tension generating mechanism is a second winch configured to wind the rotation wire.

Preferably, a wind speed sensor, wherein the float assembly is configured to lengthen at least one of the shaft wire and the rotation wire to release the tension when the wind speed sensor detects a predetermined wind speed or higher.

Preferably, a float assembly configured to float on water, comprising: a normal float; a rotation center float; and a facilitation mechanism provided between the normal float and the rotation center float so that the normal float rotates around the rotation center float.

Preferably, the facilitation mechanism includes an inner ring part, an outer ring part, and an interposition part, the rotation center float is arranged in the inner ring part, the normal float is arranged outside the outer ring part, and the outer ring part is configured to rotate together with the normal float, the interposition part is arranged between the inner ring part and the outer ring part.

Preferably, the facilitation mechanism includes a roof portion, the roof portion is arranged on an upper side of the interposition part, and is fixed to the inner ring part or the outer ring part.

Preferably, the inner ring part is directly or indirectly connected to the rotation center float, the outer ring part is directly or indirectly connected to the normal float, the inner ring part, the interposition part, and the outer ring part are independently provided.

Preferably, a rotation wire, wherein the normal float is configured to rotate around the rotation center float when the rotation wire is pulled.

Preferably, a plurality of the normal floats, wherein the rotation wire is hooked on the normal float which is arranged on an outer side among the plurality of normal floats.

BRIEF DESCRIPTION OF DRAWINGS

FIG. 8 is a perspective view showing a state in which the solar panel is removed from the float assembly shown in FIG. 7.

FIG. 11A is a perspective view of the facilitation mechanism and the rotation center float part. FIG. 11B is an enlarged view of a region B shown in FIG. 11A. FIG. 11C is an enlarged view of a region C shown in FIG. 11A. FIG. 11D is an enlarged view of the area D shown in FIG. 11A.

FIG. 14 is a top view of the float assembly showing a state in which the normal float part is rotated about the rotation center float part from the state shown in FIG. 13.

DESCRIPTION OF EMBODIMENTS

Hereinafter, the float assembly 1 according to the embodiment of the present invention will be described in detail with reference to the drawings.

1. FIRST EMBODIMENT

Figure 1:
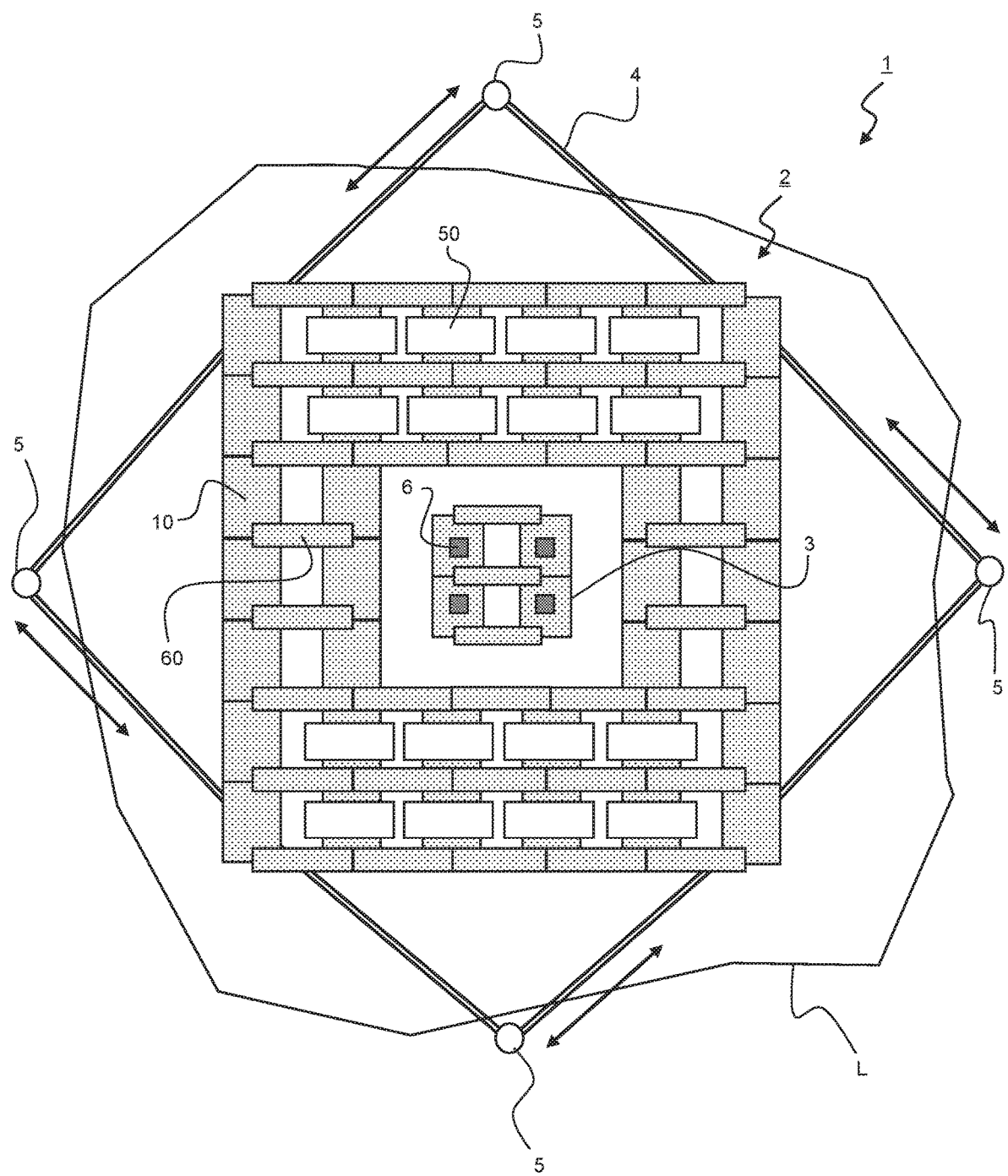
FIG. 1 is a plan view of the float assembly according to the first embodiment of the present invention.

FIG. 1 is a plan view of a float assembly 1 according to the first embodiment. As shown in the figure, the float assembly 1 comprises a normal float part 2 and a rotation center float part 3 and the float assembly 1 is floated on lake L. The lake L is just an example and the float assembly 1 of the first embodiment may be adaptable to anything on the water.

1.1 Normal Float Part 2

The normal float part 2 is configured by connecting a plurality of floats 10 (an example of "normal float") to each other. In this connecting, a passage joint 60 formed as a plastic molding are used. Here, the passage joint 60 is connected to the float 10 on the upper surface of each float 10. In the connecting direction of the passage joint 60, the floats 10 are connected at a predetermined interval. Therefore, a predetermined gap is provided between the adjacent floats 10.

Figure 4:
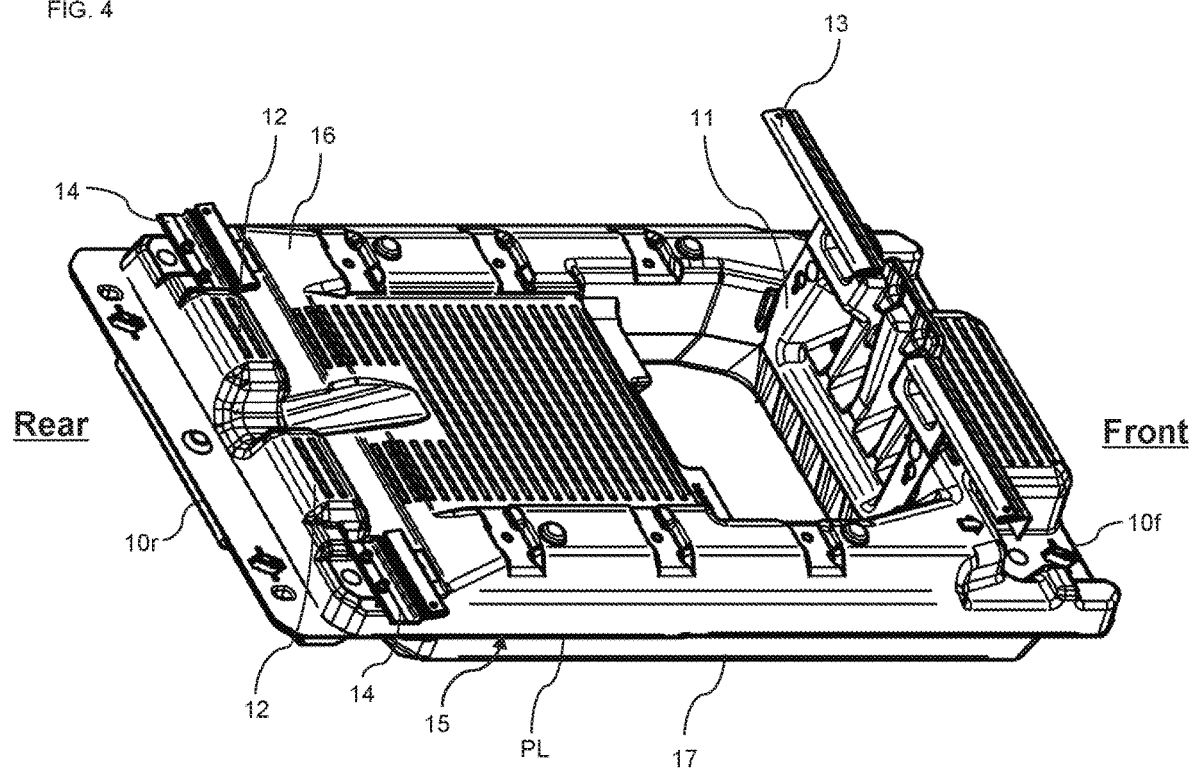
FIG. 4 is a perspective view showing an example of a float.

On the other hand, connection in a direction orthogonal to the connecting direction by the passage joint 60 is made by connecting between the eaves-shaped ends 10f, 10r of each float 10 (see FIG. 4). With such a configuration, the load originally applied to one float 10 is distributed to the front and rear floats 10.

For example, thousands of floats 10 that configure the normal float part 2 are connected. There are cases where 10 thousand floats 10 are connected. Of these floats 10, some of the floats 10 are not provided with the solar panel 50, and are used as a passage for maintenance and inspection of the solar panel 50. The passages are also used to lay cables from the solar panel 50 (equipment such as cables are not shown).

Further, as shown in FIG. 1, the normal float part 2 is configured to have a rectangular shape as a whole. A rotation wire 4 is provided in a float 10 (an example of "rotation float") located at the apex of the rectangle. This rotation wire 4 is configured to be wound by a winch 5 (example of "second tension generating mechanism" or "second winch") installed on land.

Figure 2:
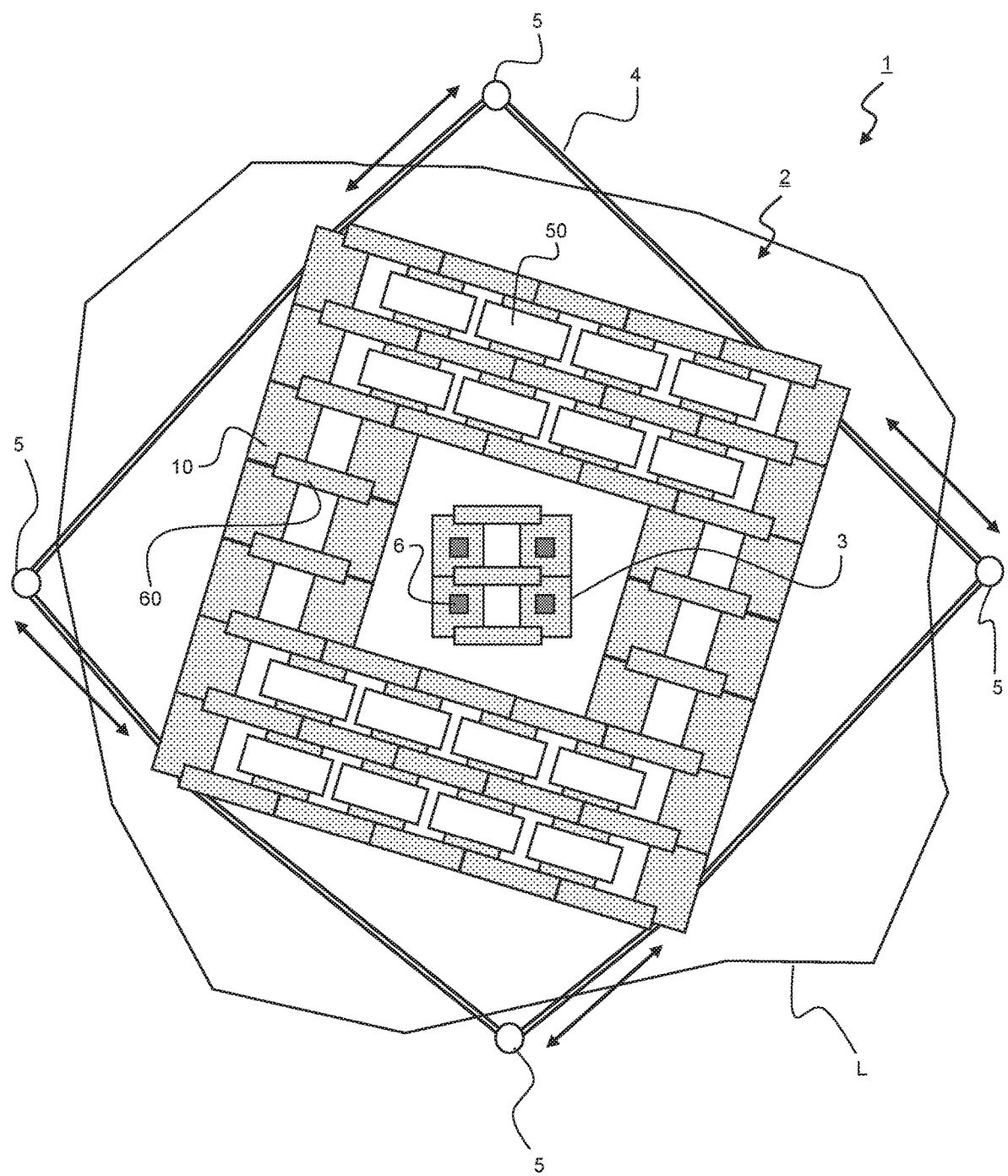
FIG. 2 is a plan view showing a state in which the float assembly is rotated from the state shown in FIG. 1.

That is, the float 10 located at the apex can be pulled by winding the rotation wire 4 through the winch 5 and shifting the position. Note that, by pulling these floats 10, the normal float part 2 is independently rotatable around the rotation center float part 3, as shown in FIG. 2. In particular, the rotation range may be less than 180 degrees, and it is preferable to appropriately set this range according to the size of the water surface of the lake L, the size of the float 10 used, and the number of the solar panel 50. And in this configuration, it is preferable to rotate the normal float part 2 slowly from sunrise to sunset so that the solar panel 50 faces a direction of the sun.

1.2 Rotation Center Float Part 3

The rotation center float part 3 comprises one or more floats 10. The same float as the float 10 of the normal float part 2 may be used for the float of the rotation center float part 3, or a different float 10 may be used.

Figure 3:
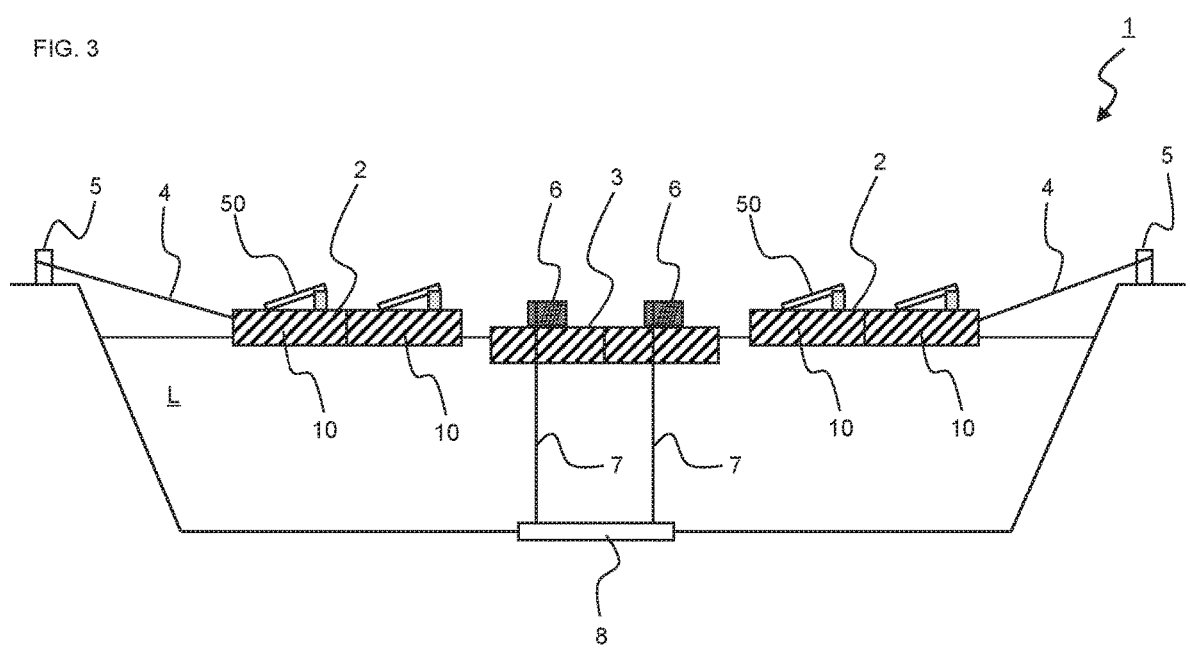
FIG. 3 is a partial cross-sectional view of the float assembly according to the first embodiment.

FIG. 3 shows a partial cross-sectional view of the float assembly 1 according to the first embodiment. The rotation center float part 3 is fixed to the bottom of the lake L via the shaft wire 7 and a fixed part 8 in contrast to the normal float part 2 which is configured to be independently rotatable. That is, one end of the shaft wire 7 is firmly fixed by the fixed part 8 (for example, an anchor embedded in the bottom or a heavy sinker), and the other end is connected to the rotation center float part 3. Specifically, the rotation center float part 3 is provided with winch 6 (example of "first tension generating mechanism" and "first winch") configured to wind the shaft wire 7. The shaft wire 7 is configured so that the length of the shaft wire 7 can be adjusted by the winch 6.

Furthermore, the winch 6 is configured to generate and maintain tension in the shaft wire 7. FIG. 3 shows an aspect in which the rotation center float part 3 is provided in the bottom direction, due to the tension applied to the shaft wire 7, compared to the normal float part 2. By using the tensioned shaft wire 7, the position and orientation of the rotation center float part 3 will be substantially fixed. Preferably, the shaft wire 7 is made of metal with relatively little expansion and contraction.

As mentioned above, the normal float part 2 rotates around the rotation center float part 3. Note that the rotation center float part 3 and the shaft wire 7 function as a rotation axis of the normal float part 2. This function suppresses the translational movement of the normal float part 2 during rotation. Conventionally, it is necessary to separately provide a high-cost pillar as such the rotation axis. By using the shaft wire 7, the float assembly 1 of the present embodiment has the function of the rotating axis while suppressing cost.

1.3 Float 10

Figure 5:
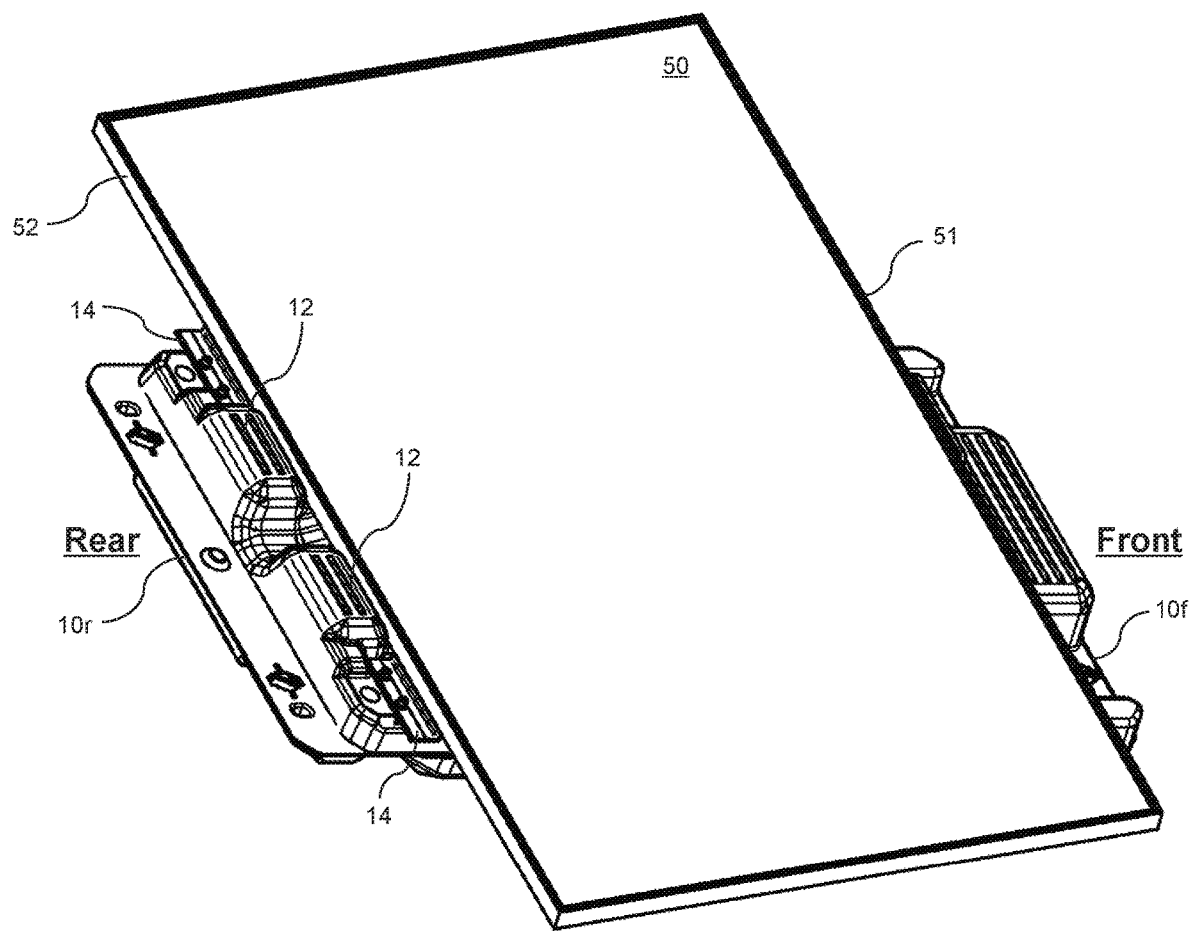
FIG. 5 is a perspective view showing a state in which a solar panel is attached to the float shown in FIG. 4.

Next, the float 10 will be described in detail with reference to FIGS. 4 and 5. FIG. 4 is a perspective view showing an example of the float 10. FIG. 5 is a perspective view showing a state in which the solar panel is attached to the float 10 shown in FIG. 4.

As shown in FIG. 4, the float 10 has an overall outer shape of a substantially rectangular shape or a rectangular shape. The float 10 has a side wall portion 15 including a parting line PL, a front surface wall 16 located on the upper side, and a back surface wall 17 located on the lower side. The float 10 has a hollow portion for containing gas, such as air inside.

The float 10 includes a supporting portion 11 that supports a front end portion 51 of a pair of longitudinal sides of the solar panel 50, and a receiving portion 12 that receives a rear end 52 of the other longitudinal side of the solar panel 50. The supporting portion 11 projects upward from the front surface wall 16 so that the solar panel 50 is installed in an appropriate inclined state in consideration of the power generation efficiency of the solar panel 50.

The front end 51 of the solar panel 50 is provided with a base made of aluminum supported by the supporting portion 11. This base is supported on the supporting portion 11. On the other hand, the float 10 is provided with front side securing metal fittings 13 for fixing a side of the front end 51 of the solar panel 50 to the supporting portion 11. Then, the solar panel 50 is fixed to the supporting portion 11 by being screwed to the securing metal fittings 13.

The rear end 52 of the solar panel 50 is also provided with an aluminum base similar to the aluminum base provided with the front end 51. The float 10 includes two rear securing metal fittings 14 for fixing a side of the rear end 52 (rear side) of the solar panel 50 supported by the receiving portion 12 to the float 10. The rear side of the solar panel 50 is fixed to the float 10 by the securing metal fittings 14 on the rear side.

The float 10 is manufactured by, for example, blow molding in which a molten cylindrical parison is sandwiched between split molds and expanded. Various molding material can be used as the molding material. For example, polyolefin-based resins such as polyethylene and polypropylene are preferable as molding materials.

2. SECOND EMBODIMENT

Figure 6:
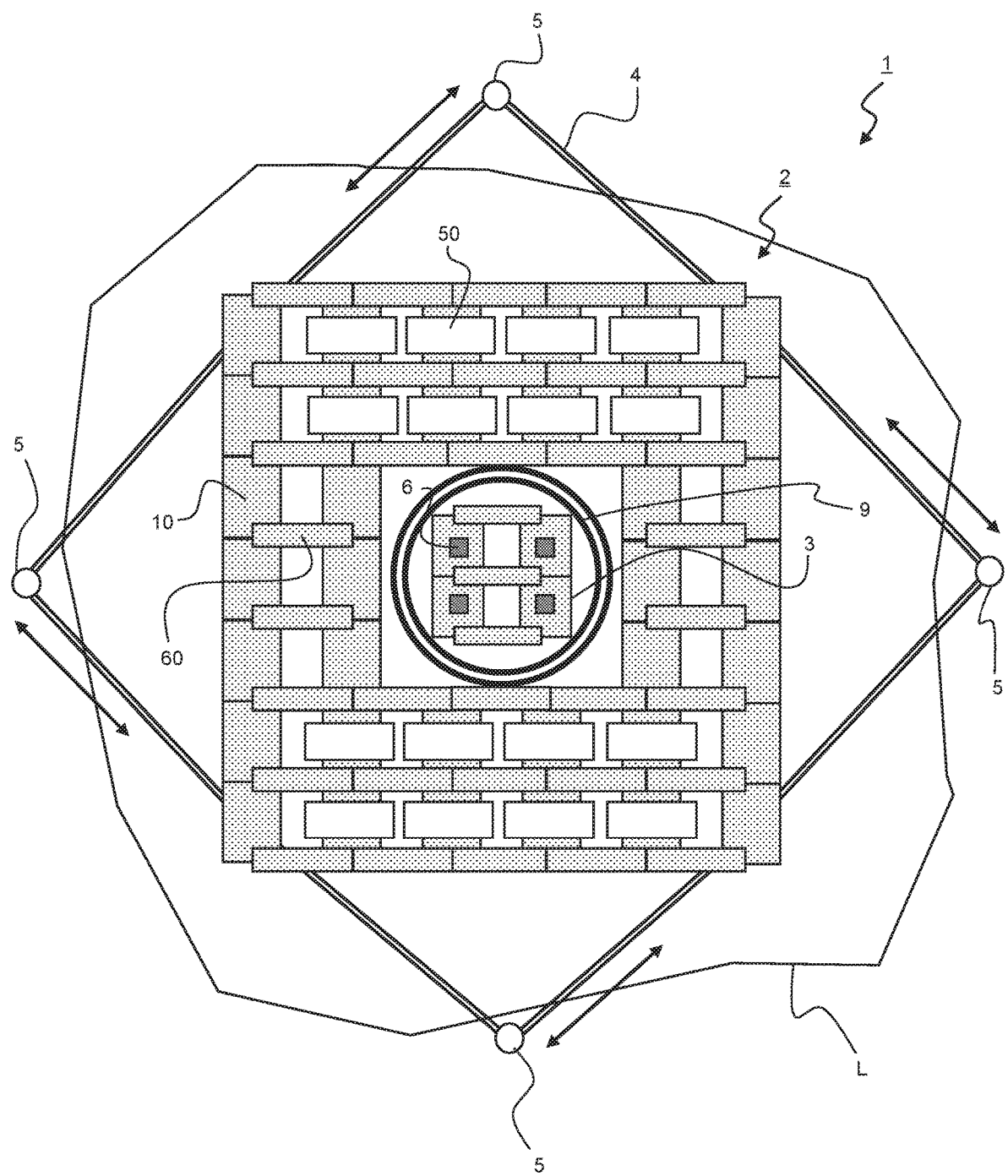
FIG. 6 is a plan view of the float assembly according to the second embodiment of the present invention.

FIG. 6 is a plan view of the float assembly 1 according to the second embodiment. Similar to the float assembly 1 according to the first embodiment, the float assembly 1 comprises the normal float part 2 and the rotation center float part 3 and is floated on the lake L. Here, unlike the float assembly 1 according to the first embodiment, the float assembly 1 according to the second embodiment comprises a facilitation mechanism 9 provided at the boundary between the normal float part 2 and the rotation center float part 3.

The normal float part 2 is rotated around the rotation center float part 3, but since the rotation center float part 3 of the first embodiment has an angular shape, the angular shape may prevent the normal float part 2 from rotating smoothly. As shown in FIG. 6, the facilitation mechanism 9 comprises, for example, substantially a annular rail, so that the normal float part 2 can be expected to rotate smoothly. The mechanism is not limited to the rail. It may be used any mechanism that does not prevent rotation of the normal float part 2 when the normal float part 2 and the rotation center float part 3 contact each other.

3. THIRD EMBODIMENT

Figure 7:
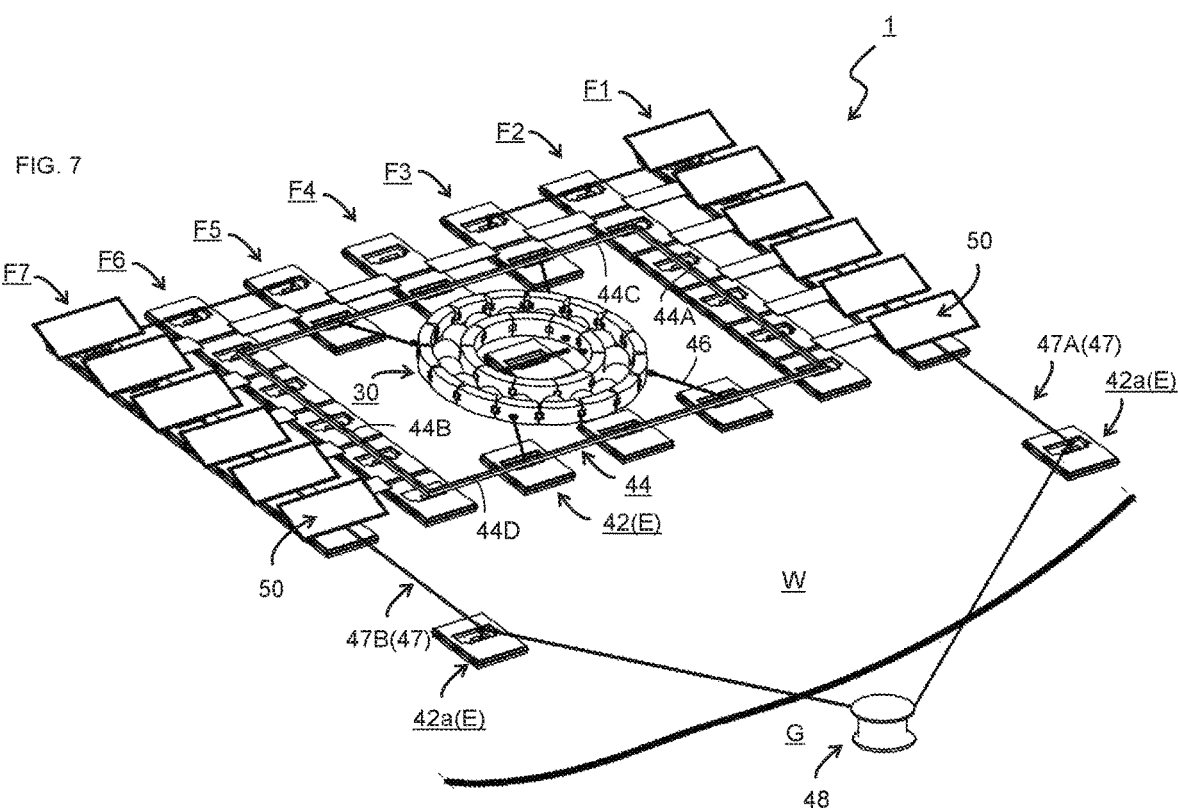
FIG. 7 is a perspective view showing a state in which the solar panel is attached to the float assembly according to the third embodiment of the present invention.
Figure 12A:
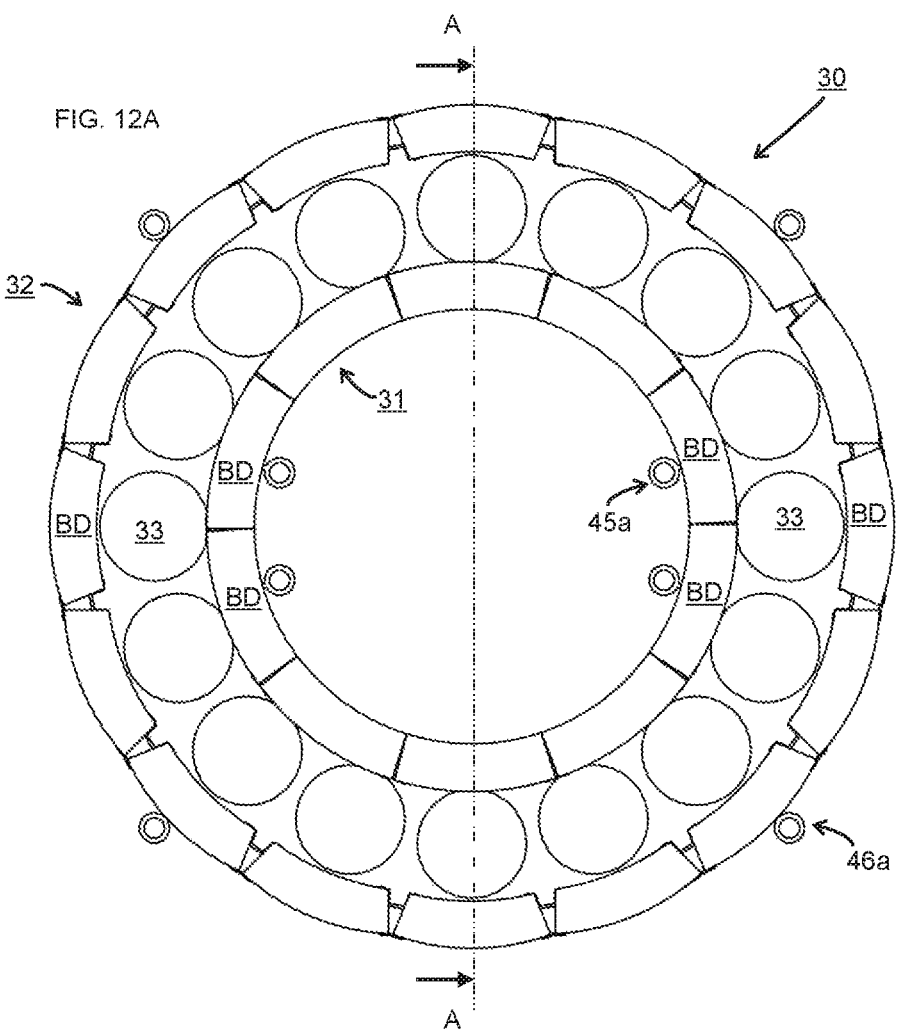
FIG. 12A is a top view of the facilitation mechanism.

As shown in FIGS. 8 and 11A and 12A, the float assembly 1 according to the third embodiment comprises the normal float part 42, the passage joint 60, adjustment float parts 42a, the rotation center float part 43, and connecting portions 44, inner connecting portions 45, outer connecting portions 46, rotation wires 47, the shaft wire 7, a facilitation mechanism 30, and a tension generation mechanism 48. The float assembly 1 according to the third embodiment has a uniaxial type rotation body similar to the first and second embodiments. And the float assembly 1 according to the third embodiment has a rotation center float part 43 as a center, and the float assembly 1 is configured so that the normal float part 42 rotate around the rotation center float part 43. The facilitation mechanism 30 according to the third embodiment has the same function as the facilitation mechanism 9 described in the second embodiment. As shown in FIG. 7, the solar panels 50 are attached to the normal float part 42 of the float assembly 1.

Figure 9A:
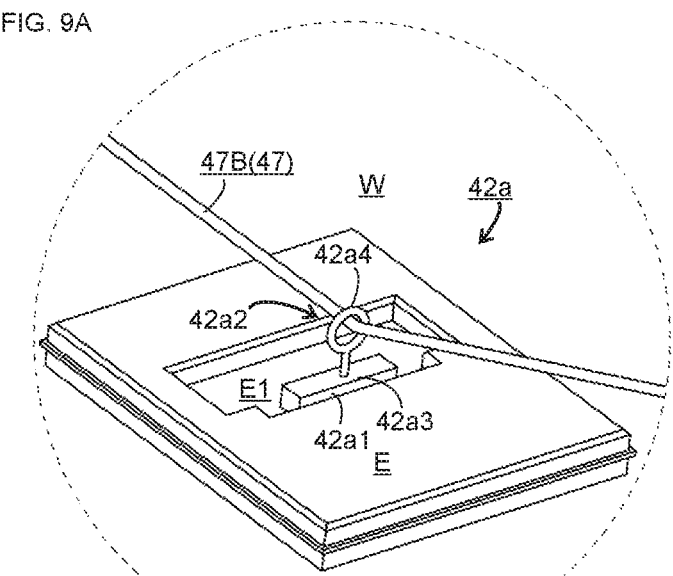
FIG. 9A is an enlarged view of region A shown in FIG. 8.
Figure 9B:
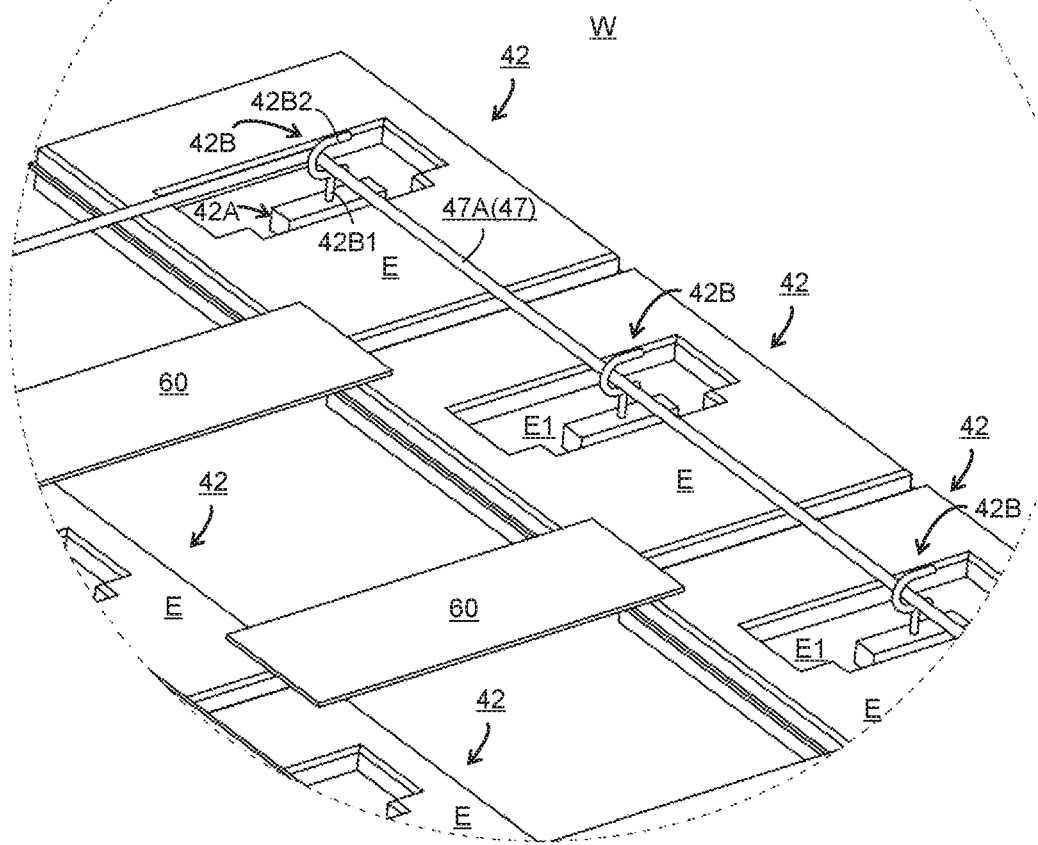
FIG. 9B is an enlarged view of region B shown in FIG. 8.

As shown in FIGS. 8 to 9B, the normal float part 42, the adjustment float part 42a, and the rotation center float part 43 have one or more floats E. The float E has a configuration corresponding to that of the float 10 of the first embodiment. The float E has a different shape from that of the float 10, but the function is the same. A concave portion E1 is formed on the float E, and a base portion 42A described later is placed on the concave portion E1.

3.1 Facilitation Mechanism 30

Figure 12B:
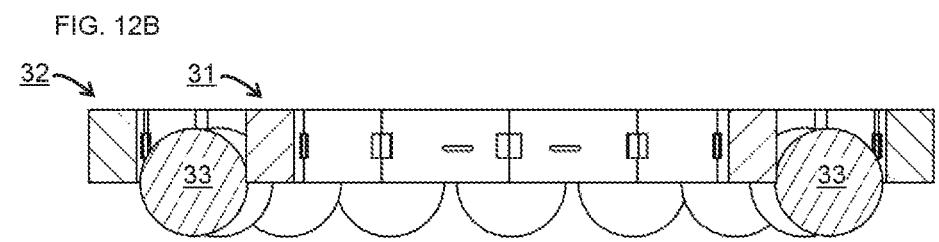
FIG. 12B is a sectional view taken along the line A-A shown in FIG. 12A.
Figure 13:
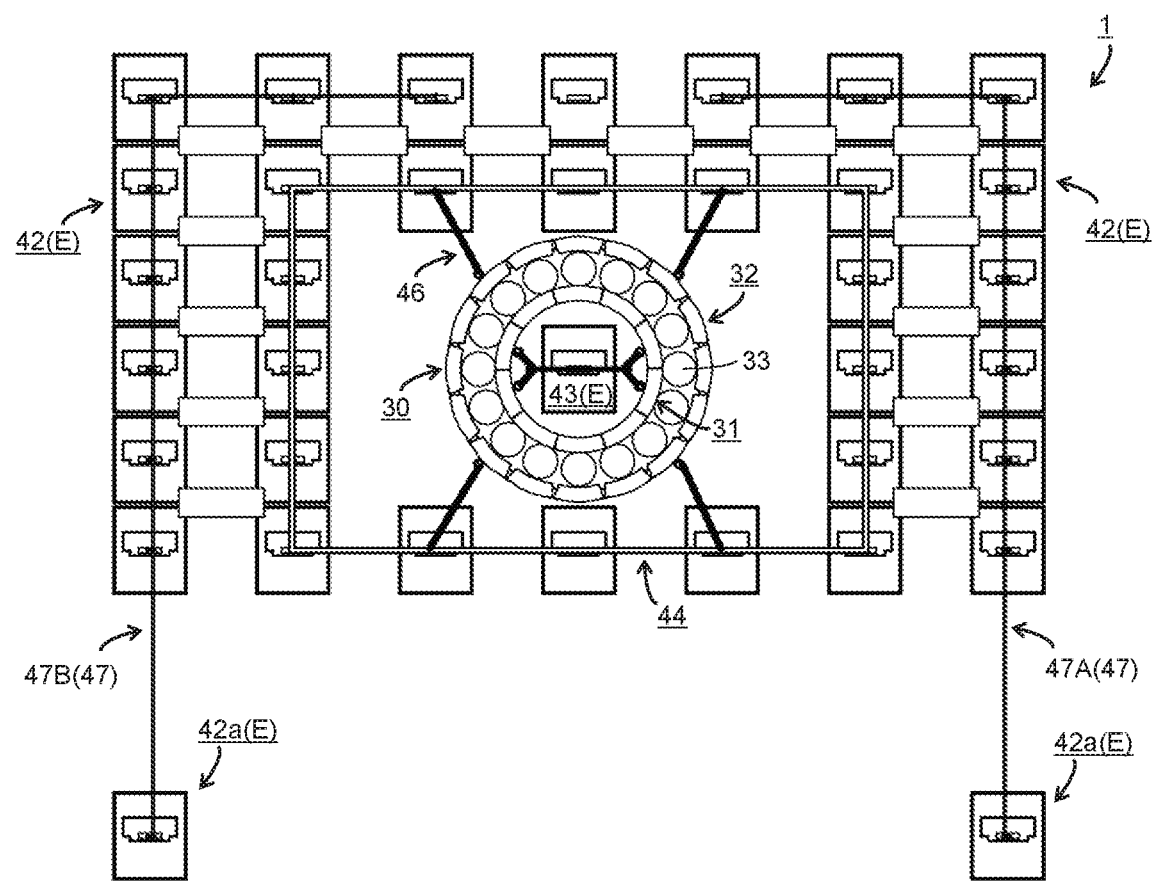
FIG. 13 is a top view of the float assembly shown in FIG. 8.

As shown in FIGS. 11 to 13, the facilitation mechanism 30 is provided between the normal float part 42 and the rotation center float part 43 so that the normal float part 42 rotates around the rotation center float part 43. As shown in FIGS. 11 to 12B, the facilitation mechanism 30 includes an inner ring part 31, an outer ring part 32, and an interposition part 33. The inner ring part 31, the outer ring part 32, and the interposition part 33 are each configured to float on water. When using float assembly 1, inner ring part 31, outer ring part 32, and interposition part 33 are floating in the water.

As shown in FIGS. 11A to 12B, the inner ring part 31 has a ring shape, and in the third embodiment, the inner ring part 31 is configured by arranging a plurality of block bodies BD in the ring shape. A rotation center float part 43 is arranged inside the inner ring part 31. The inner ring part 31 is directly or indirectly connected to the rotation center float part 43. In the third embodiment, the inner ring part 31 is connected to metal fittings 45a (for example, eye bolts) connected to the inner connecting portion 45. That is, the inner ring part 31 is connected with the rotation center float part 43 via the inner connecting portion 45. This suppresses the inner ring part 31 from translating or rotating with respect to the rotation center float part 43, so that the inner ring part 31 is suppressed from colliding with the rotation center float part 43. As a result, damage to the inner ring part 31 is suppressed. The interposition parts 33 are arranged around the inner ring part 31.

As shown in FIGS. 11 to 12B, the outer ring part 32 also has a ring shape similar to the inner ring part 31, and in the third embodiment, the outer ring part 32 is configured by arranging a plurality of block bodies BD in the ring shape. The outer ring part 32 is arranged outside the inner ring part 31 and the interposition part 33. As shown in FIG. 13, a normal float part 42 is arranged outside the outer ring part 32. The outer ring part 32 is directly or indirectly connected to the normal float part 42. In the third embodiment, the outer ring part 32 is connected to metal fittings 46a (for example, eye bolts) connected to the outer connecting portion 46. The outer ring part 32 is connected with the normal float part 42 via the outer connecting portion 46, and the outer ring part 32 and the normal float part 42 are configured to integrally rotate.

As shown in FIGS. 11 to 12B, the block body BD has an arc shape. In the third embodiment, the inner ring part 31 includes 10 block bodies BD, and the outer ring part 32 includes 16 block bodies BD. The block body BD of the inner ring part 31 and the block body BD of the outer ring part 32 have the same configuration. As described above, the block body BD is used for both the inner ring part 31 and the outer ring part 32, thus suppressing the manufacturing cost of the facilitation mechanism 30.

As shown in FIG. 11B, the inner ring part 31 has fixing members 31B. The fixing members 31B are provided on the outer peripheral surface of the block body BD, and the fixing member 31B fixes a pair of adjacent block bodies BD. As shown in FIGS. 11C and 11D, the outer ring part 32 has fixing members 32A and fixing members 32B. The fixing members 32A are provided on the outer peripheral surface of the block body BD, the fixing members 32B are provided on the inner peripheral surface of the block body BD, and the fixing member 32A and the fixing member 32B fix a pair of adjacent block bodies BD.

As shown in FIGS. 11A, 12A, and 12B, the interposition part 33 is arranged between the inner ring part 31 and the outer ring part 32. The horizontal cross-sectional shape of the interposition part 33 is circular, and in the third embodiment, the interposition part 33 has sphere shape. Here, this horizontal cross-section is a section parallel to water surface W. Since the horizontal cross-sectional shape of interposition part 33 is circular, friction between outer ring part 32 and interposition part 33 is suppressed, and as a result, rotation of outer ring part 32 is smoothed and outer ring part 32 and interposition part 33 damage is suppressed. The shape of the interposition part 33 is not limited to sphere, and the interposition part 33 may have, for example, a cylindrical shape.

Further, it is preferable that the interposition part 33 is densely arranged in the annular region between the inner ring part 31 and the outer ring part 32. The interposition part 33 may not be densely arranged in this annular region. Here, how many interposition parts 33 are preferably arranged in this annular region, will be described. The annular region where the interposition part 33 are placed is divided into two regions, one region is defined as the first region, and the other region is defined as the second region. The first and second regions are both semi-circular regions, respectively. If the interposition part 33 is not densely arranged in this annular region, the distribution of the interposition part 33 may be biased to the first region due to the waves or the rotation of the normal float part 42. When the distribution of the interposition parts 33 is biased to the first region, the inner ring part 31 and the outer ring part 32 contact in the second region, the rotation of normal float part 42 is hindered, and the inner ring part 31 and the outer ring part 32 are damaged.

Therefore, it is preferable that the facilitation mechanism 30 includes minimum value N or more interposition parts 33. When arranging interposition part 33 from the end of the first region in order, the minimum value N is defined as the number that the interposition part 33 cannot be located in the first region and the interposition part 33 first protrudes into the second region. Since the facilitation mechanism 30 has the interposition part 33 with the minimum value N or more, even if the distribution of the interposition part 33 is biased to the first region, at least one interposition part 33 is located in the second region. This suppresses the contact between the inner ring part 31 and the outer ring part 32 in the second region. As a result, the hindering of the rotation of the normal float part 42 is suppressed, and damage to the inner ring part 31 and outer ring part 32 is suppressed.

As described above, the float assembly 1, according to the third embodiment, includes the facilitation mechanism 30 as a sliding member. Thus, even though the rotation center float part 43 as the central axis and the normal float part 42 where the solar panel 50 is installed does not connect with each other, the normal float part 42 can rotate around the rotation center float part 43.

3.2 Normal Float Part 42 and Passage Joint 60

As shown in FIG. 8, the normal float part 42 has float rows F1 to F7, and the float rows F1 to F7 has a plurality of the float E, respectively. In the third embodiment, seven float rows are arranged around the facilitation mechanism 30. Note that the number of float row is not limited to seven. The passage joint 60 is provided to connect the normal float part 42 of each float row.

As shown in FIG. 8, the float row F1 is arranged at one end of the normal float part 42, and the float row F7 is arranged at the other end of the normal float part 42. That is, the float rows F1 and F7 are located outside the normal float part 42. The float rows F2 to F6 are located between the float rows F1 and float row F7. The float row F3 is divided into two mutually connecting the float E and one the float E by the facilitation mechanism 30. The same applies to the float rows F4 and F5. In the float row F1, adjacent floats E are connecting, and six floats E are arranged in a straight line. The same applies to the float row F2, F6, and F7. There is a space between adjacent float rows. That is, the float row F1 to F7 are floated on the water independently of each other.

As shown in FIGS. 8 and 9B, the normal float part 42 has base portions 42A and hook portions 42B. The base portion 42A is a block-shaped member. The base portion 42A is arranged on the float E, and the base portion 42A supports the connecting portion 44. The base portion 42A is fixed to the float E. The base portions 42A are provided in the float rows F2 to F6 in float E. The hook portion 42B has a fixed part 42B1 and an arcuate part 42B2. The fixed part 42B1 is fixed to the base portion 42A. The arcuate part 42B2 is attached to the fixed part 42B1, and the arcuate part 42B2 has an arc shape so that the rotation wire 47 can be hooked. The arcuate part 42B2 does not have a ring shape, but the arcuate part 42B2 extends above the rotation wire 47 while bending, and the rotation wire 47 is hard to separate from the arcuate part 42B2. The hook portion 42B are provided in the float rows F1 to F3 and F5 to F7 in the float E.

3.3 Adjustment Float Part 42A

As shown in FIGS. 8 and 9A, the float assembly 1 has two adjustment float parts 42a. Each adjustment float part 42a has one float E. Each adjustment float part 42a is arranged between the normal float part 42 and the land G side, and each adjustment float part 42a is independent of the normal float part 42. Here, since the tension generation mechanism 48 is arranged on the land G, the tension generation mechanism 48 is provided at a higher place than the normal float part 42. Therefore, in the direction from the tension generation mechanism 48 side toward the normal float part 42 side, the rotation wire 47 is likely to incline downward with respect to the water surface W. That is, the angle formed by the rotation wire 47 and the water surface W tends to increase. If the angle formed by the rotation wire 47 and the water surface W increases, the possibility that the rotation wire 47 will separate from the hook portion 42B of the normal float part 42 increases. However, since the float assembly 1 has the adjustment float part 42a, it is possible to suppress the increase of the angle formed between the water surface W and the portion of the rotation wire 47 from the adjustment float part 42a to the normal float part 42. That is, as shown in FIG. 11, the rotation wire 47 is guided from the adjustment float part 42a to the normal float part 42 in parallel or substantially parallel to the water surface W. This reduces the possibility that the rotation wire 47 will separate from the hook portion 42B of the normal float part 42.

As shown in FIG. 9A, each adjustment float part 42a has the base portion 42a1 and the hook portion 42a2 (not shown). The base portion 42a1 of each adjustment float part 42a has the same configuration of the base portion 42A. The hook portion 42a2 has a fixed part 42a3 and a ring part 42a4. The fixed part 42a3 is fixed to the base portion 42a1, and the ring part 42a4 is attached to the fixed part 42a3. The ring part 42a4 has a ring shape, and the rotation wire 47 is inserted into the ring part 42a4. Since the ring part 42a4 has an annular shape, the rotation wire 47 is prevented from separating from the ring part 42a4.

3.4 Rotation Center Float Part 43 and Wire for Shaft 7

Figure 10:
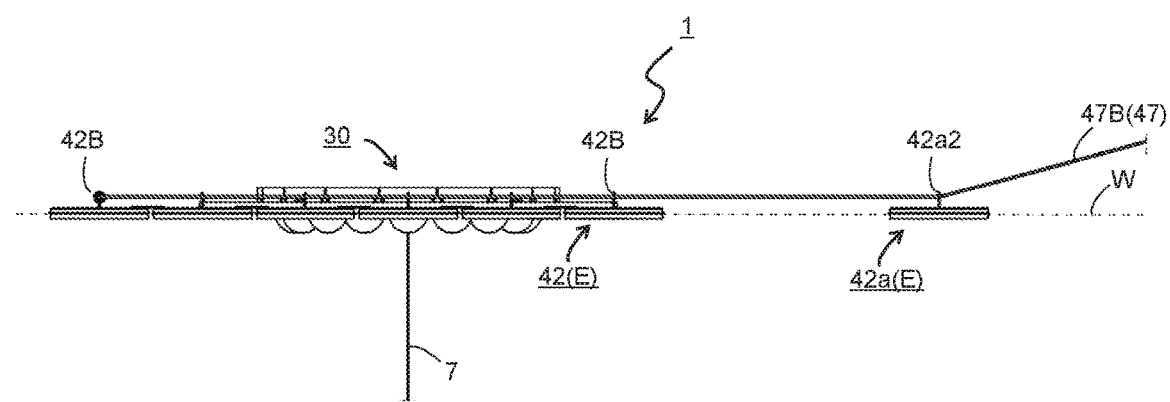
FIG. 10 is a left side view of the float assembly shown in FIG. 9.

As shown in FIG. 11A, the rotation center float part 43 has one float E. The rotation center float part 43 is located inside the facilitation mechanism 30. The number of float E of the rotation center float part 43 is not limited to one and may be plural. Similar to the first embodiment, the rotation center float part 43 is provided on a side of the bottom of the water than the normal float part 42. Further, as shown in FIG. 10, similar to the first embodiment, one end of the shaft wire 7 is firmly fixed by a fixed part (not shown), and the other end of the shaft wire 7 is connected to the float E of the rotation center float part 43. Then, the length of the shaft wire 7 is adjusted by a first tension generating mechanism (not shown). The rotation center float part 43 is connected to the shaft wire 7, so the rotation center float part 43 is pulled down by the shaft wire 7. As a result, the upper-end surface of the inner ring part 31 is provided at a position higher than the water surface W than the entire rotation center float part 43.

As shown in FIG. 11A, the rotation center float part 43 has a base portion 43A and a rail part 43B. The configuration of the base portion 43A is similar to that of the base portion 42A, and the base portion 43A is fixed to the float E. The rail part 43B is fixed on the base portion 43A. The rail part 43B is connecting to the inner connecting portion 45. As described above, since the rotation center float part 43 is pulled down by the shaft wire 7, the height position of the rail part 43B is prevented from becoming higher than that of the inner ring part 31. This prevents the rail part 43B from lifting the inner ring part 31 via the inner connecting portion 45, and as a result, the inner ring part 31 is prevented from moving upward from the water surface W.

3.5 Connecting Portion 44

As shown in FIG. 8, the connecting portion 44 connects multiple floats E of the normal float part 42. The connecting portion 44 has a rectangular shape, and the connecting portion 44 is arranged so as to surround the facilitation mechanism 30. A member (for example, an eyebolt) that connects to the outer connecting portion 46 is connected to the connecting portion 44. The connecting portion 44 has side portions 44A to 44D, each having a rail shape. The side portions 44A to 44D are fixed on the base portion 42A of the normal float part 42. The side portion 44A connects to the side portion 44C and the side portion 44D, and the side portion 44B also connects to the side portion 44C and the side portion 44D. The same applies to the side portion 44B to 44D. The side portion 44A is provided in the float row F2 of the normal float part 42, and the side portion 44B is provided in the float row F6 of the normal float part 42. The side portion 44C and the side portion 44D are provided in the float rows F2 to F6 of the normal float part 42.

3.6 Inner Connecting Portion 45 and Outer Connecting Portion 46

As shown in FIGS. 8 and 11A, the inner connecting portion 45 connects the inner ring part 31 and the rotation center float part 43. Specifically, the inner connecting portion 45 is connecting to the rail part 43B of the rotation center float part 43. The outer connecting portion 46 connects the outer ring part 32 and the connecting portion 44. The inner connecting portion 45 and the outer connecting portion 46 may be configured by, for example, a turnbuckle or a hand-wound jack.

3.7 Rotation Wire 47

As shown in FIGS. 8 and 13, the rotation wire 47 is hooked on the normal float part 42. As shown in FIGS. 13 and 14, when the rotation wire 47 is pulled, the normal float part 42 rotates around the rotation center float part 43 and the facilitation mechanism 30. At this time, the normal float part 42, the connecting portion 44, the outer connecting portion 46, and the outer ring part 32 rotate together, and the inner ring part 31, the inner connecting portion 45, and the rotation center float part 43 do not rotate. One end of the rotation wire 47 is fixed to the normal float part 42, and the other end of the rotation wire 47 is provided on the land G side. Here, the land G is defined as a place where the tension generation mechanism 48 is arranged. And the land G may be, for example, a land surface surrounding the lake or a landfill provided in the lake. The rotation wire 47 has a first wire 47A and a second wire 47B.

As shown in FIGS. 8 and 9B, the first wire 47A and the second wire 47B are hooked on the floats E, which are arranged on the outer side among the normal float parts 42. Specifically, one end of the first wire 47A is fixed to the hook portion 42B of the float row F3 of the normal float part 42, and the other end of the first wire 47A is provided on the land G side. As shown in FIGS. 8 and 9A, the portion between the one end side and the other end side of the first wire 47A is hooked on the hook portion 42B of the float row F1 of the normal float part 42, and is inserted through the ring part 42a4 of the adjustment float part 42a. Further, as shown in FIG. 8, one end of the second wire 47B is fixed to the hook portion 42B of the float row F5 of the normal float part 42, and the other end of the second wire 47B is provided on the land G side. The part between the one end side and the other end side of the second wire 47B is hooked on the hook portion 42B of the float row F7 of the normal float part 42 and is inserted through the ring part 42a4 of the adjustment float part 42a.

In this way, the first wire 47A and the second wire 47B are hooked on the float E, which is the outermost part of the normal float part 42. Therefore, the rotation torque acting on the normal float part 42 from the first wire 47A or the second wire 47B becomes large, and as a result, the power required by the tension generation mechanism 48 is reduced when the tension generation mechanism 48 rotates the normal float part 42. From the viewpoint of increasing the rotation torque, it is preferable that the first wire 47A and the second wire 47B are hooked on the float E which is arranged at the outermost part of the normal float part 42. But the arrangement of the first and second wires 47A and 47B are not limited to this arrangement. Specifically, the float E (herein referred to as the outermost float) may be arranged outside the float E on which the first wire 47A or the second wire 47B is hooked. That is, the first wire 47A and the second wire 47B may not be arranged on the outermost part of the normal float part 42, but may be arranged on the outer side of the normal float part 42. Even with such an arrangement, the rotation torque acting on the normal float part 42 from the first wire 47A or the second wire 47B can be increased. Since the solar panel 50 is not arranged outside the float E on which the first wire 47A or the second wire 47B is hooked, the outermost float described above is used as the passage.

3.8 Tension Generation Mechanism 48

The tension generation mechanism 48 has a mechanism that winds the rotation wire 47 and sends out the rotation wire 47. The tension generation mechanism 48 may be, for example, an endless winch driven by a driving device (motor). When the tension generation mechanism 48 winds up the rotation wire 47, the tension is generated in the rotation wire 47, and the normal float part 42 and the outer ring part 32 rotate around the rotation center float part 43. The tension generation mechanism 48 is not limited to the endless winch. And the tension generation mechanism 48 can also be configured with a manually operated winch. Further, in the third embodiment, the float assembly 1 includes the tension generation mechanism 48, but the float assembly 1 does not have to includes the tension generation mechanism 48. For example, workers may rotate the normal float part 42 and the outer ring part 32 by pulling the rotation wire 47.

4. MODIFICATION

The float assembly 1 according to this embodiment can also be implemented in the following configuration.

Firstly, in the above-described first and second embodiments, the winch 5 is arranged on the land, but the winch 5 may be provided in the float 10 positioned at the apex of the normal float part 2. In such a case, it is necessary to fix the rotation wire 4 on the land. Even with such a configuration, the normal float part 2 can rotate around the rotation center float part 3 and the shaft wire 7.

Secondly, in the above-described first and second embodiments, the normal float part 2 rotates around the rotation center float part 3 and the shaft wire 7 by the rotation wire 4 and the winch 5. Instead of using the rotation wire 4 and the winch 5, the normal float part 2 may be rotated around the rotation center float part 3 and the shaft wire 7 by a screw or the like provided on the lower surface of the normal float part 2.

Thirdly, a water level sensor and control means (not shown) may be provided in the float assembly 1 or near the land. In particular, it can often be assumed that the water level in lake L changes depending on weather conditions such as rain. Therefore, based on the water level observation result by the water level sensor, the control means controls winch 6 so that the length and tension of shaft wire 7 are adjusted appropriately, thereby reducing the load on shaft wire 7 and maintaining the function of the rotation axis more stable.

Fourth, a wind speed sensor and control means (not shown) may be provided in the float assembly 1 or near the land. Especially in bad weather such as typhoons, there is a concern that the rotation wire 4 and the shaft wire 7 will be overloaded, and in the worst case, they will be disconnected. Thus, when the wind speed sensor detects a predetermined wind speed or higher, the control means controls winch 5 and winch 6 so that rotation wire 4 and shaft wire 7 are intentionally lengthened, thereby reducing the load on the rotation wire 4 and the shaft wire 7 and stabilizing the float assembly 1.

Fifth, the shaft wire 7 does not necessarily have to be fixed to the bottom of the water. For example, the shaft wire 7 may be fixed to a pier provided in a position higher than bottom of the water or an auxiliary wire extending in a bridge shape. That is, the shaft wire 7 may be configured to extend from the float assembly 1 toward the underwater.

Sixth, in the first and second embodiments, the normal float part 2 is configured to rotate around the rotation center float part 3, but the embodiment may have another form. Specifically, as long as the float assembly 1 is moored by the tensioned shaft wire 7 and the float assembly 1 is configured to be rotatable, the float assembly 1 may have another form. For example, if a ball joint mechanism is attached to one end of the shaft wire 7 and fixed in the underwater, the float assembly 1 can be rotated together with the shaft wire 7. In such a configuration, the rotation center float part 3 is not necessary, and the float assembly 1 can be configured by the normal float part 2 as a whole. Alternatively, if the ball joint mechanism is attached to the back surface of the float located substantially in the center of the float assembly 1, the shaft wire 7 can be fixed, and the float assembly 1 can be rotated as a whole.

Seventh, the rotation center float part 3 only needs to define the rotation axis, and does not necessarily have to be substantially in the center. That is, in the first and second embodiments, the normal float part 2 rotates around the rotation center float part 3, but the rotation center float part 3 may be located beside the normal float part 2 and the normal float part 2 may revolve around the rotation center float part 3.

Figure 15A:
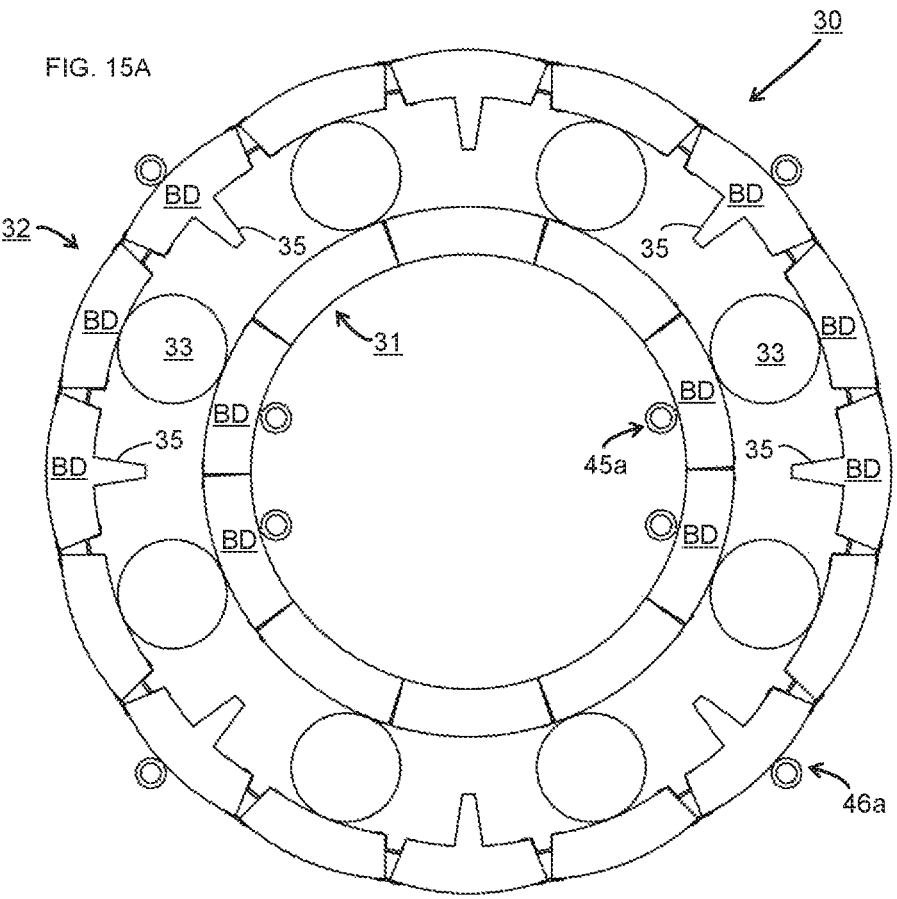
FIG. 15A is a top view of the facilitation mechanism according to the modification 1 of the third embodiment.
Figure 15B:
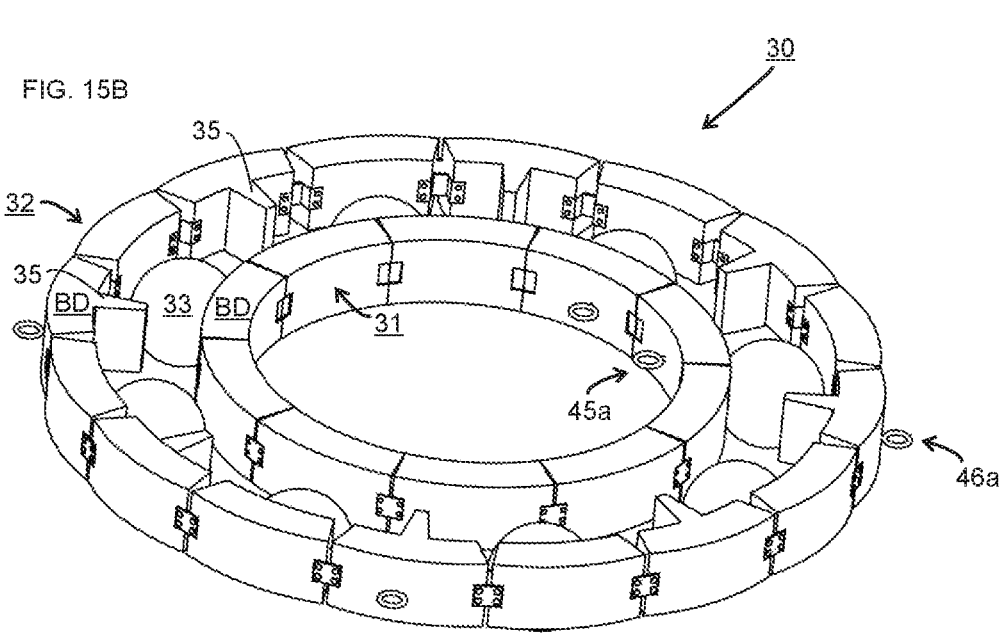
FIG. 15B is a perspective view of the facilitation mechanism shown in FIG. 15A.

Eighth, as shown in FIGS. 15A and 15B, the facilitation mechanism 30 may include a plurality of partition parts 35. The plurality of partition parts 35 are annularly arranged in the space between the inner ring part 31 and the outer ring part 32. One interposition part 33 is arranged between a pair of adjacent partition parts 35. As described above, the facilitation mechanism 30 includes the plurality of partition parts 35, the biased distribution of the interposition parts 33 is suppressed even if the interposition parts 33 does not need to be densely arranged between the inner ring part 31 and the outer ring part 32 in the circumferential direction. As a result, even if the number of interposition parts 33 provided in the facilitation mechanism 30 is reduced, the function of the interposition parts 33 is more reliably exhibited.

Figure 16A:
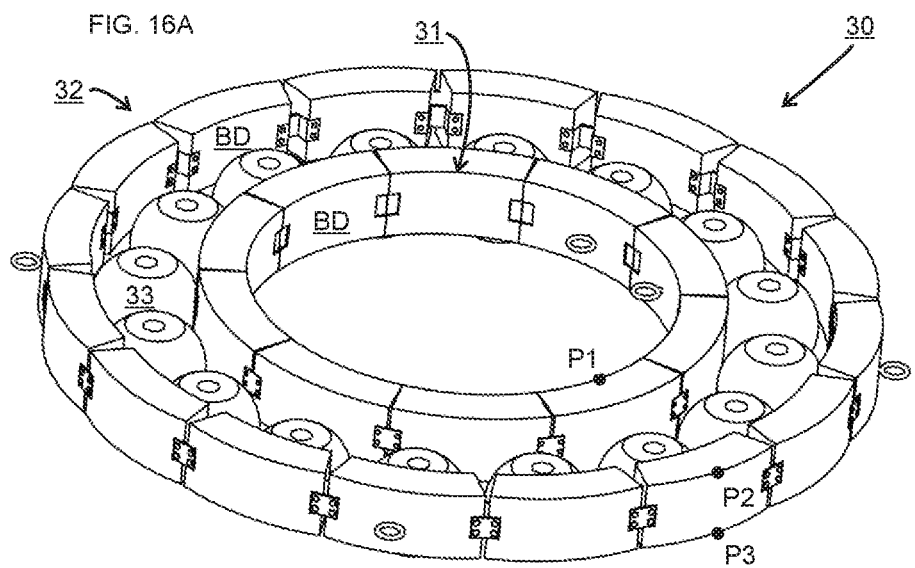
FIG. 16A is a perspective view of the facilitation mechanism according to the modification 2 of the third embodiment.
Figure 16B:
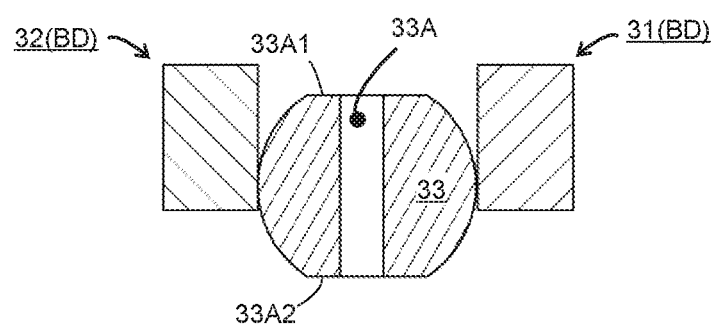
FIG. 16B is an end view passing through points P1, P2, and P3 shown in FIG. 16A.

Ninth, as shown in FIGS. 16A and 16B, the interposition part 33 may be formed with a flat upper end surface 33A1 and a flat lower end surface 33A2. As a result, the interposition part 33 easily rotates around an axis parallel to the vertical direction. In other words, the interposition part 33 is less likely to rotate about an axis parallel to the horizontal direction, so the unnecessary rotation of the interposition part 33, that is, the rotation, of the interposition part 33, that is less likely to contribute to the smooth rotation of the outer ring part 32 is suppressed. Thus, the friction between the interposition part 33 and the inner ring part 31 and the friction between the interposition part 33 and the outer ring part 32 are suppressed, and as a result, damages of the inner ring part 31, the outer ring part 32, and the interposition part 33 are suppressed. Further, in the interposition part 33, as shown in FIGS. 16A and 16B, a through hole 33B may be formed. As a result, water flows into the through holes 33B and the orientation of the interposition part 33 is stabilized. As a result, the interposition part 33 becomes easier to rotate around the axis parallel to the vertical direction, and the unnecessary rotation of the interposition part 33 is further suppressed.

Figure 17A:
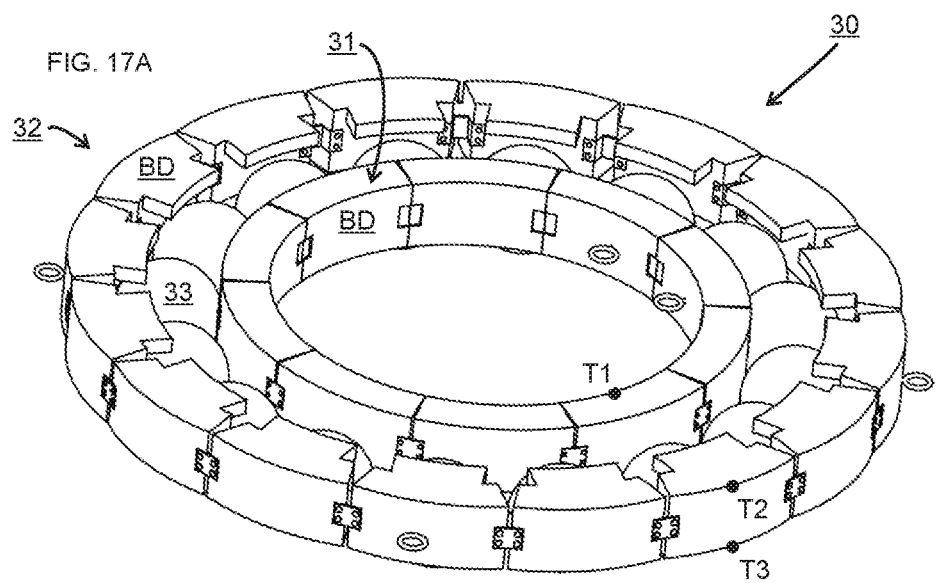
FIG. 17A is a perspective view of the facilitation mechanism according to the modification 3 of the third embodiment.
Figure 17B:
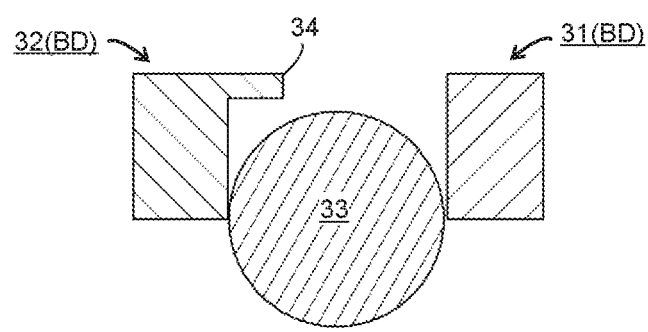
FIG. 17B is an end view passing through points T1, T2, and T3 shown in FIG. 17A.

Tenth, as shown in FIGS. 17A and 17B, the facilitation mechanism 30 may include a roof portion 34. The roof portion 34 is located above the interposition part 33. The roof portion 34 is fixed to the outer ring part 32. The roof portion 34 may be fixed to the inner ring part 31. Since the facilitation mechanism 30 includes the roof portion 34, it is possible to prevent the interposition part 33 from jumping out between the inner ring part 31 and the outer ring part 32.

Figure 18A:
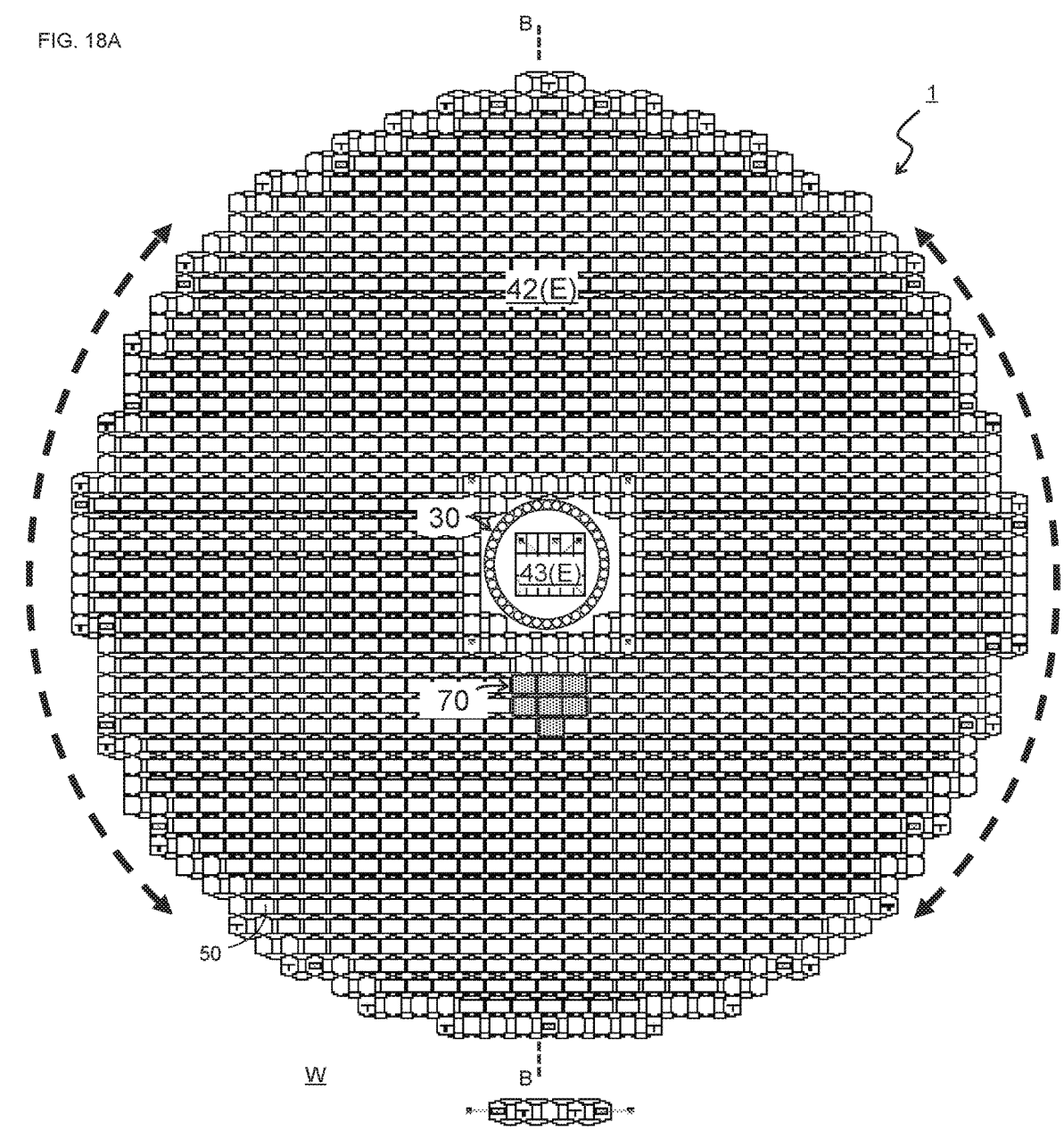
FIG. 18A is a top view of the float assembly showing Modification 4 of the third embodiment.
Figure 18B:
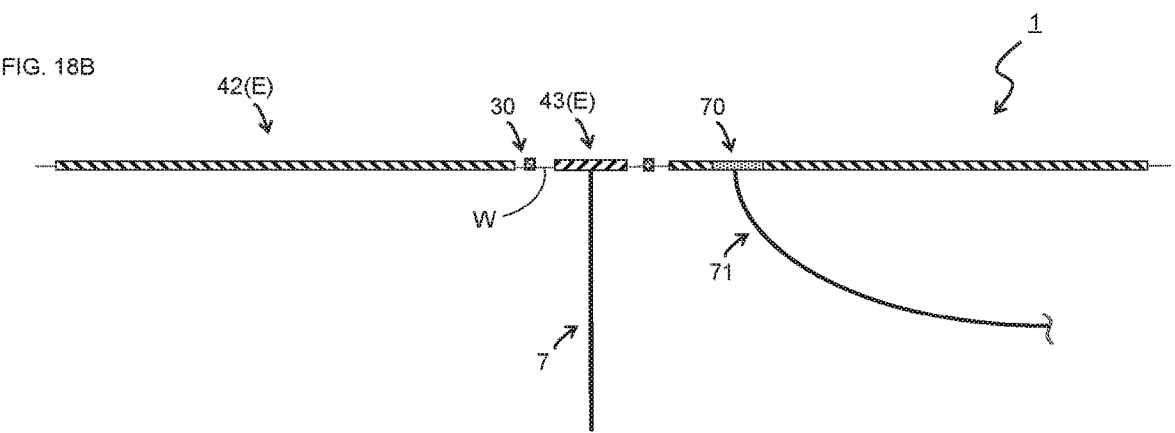
FIG. 18B is a diagram schematically showing the B-B end surface shown in FIG. 18A in a state in which the solar panel shown in FIG. 18A is omitted.

Eleventh, as shown in FIG. 18A, the float assembly 1 may include the normal float part 42 having hundreds of floats E, the rotation center float part 43 having a plurality of floats E, and the facilitation mechanism 30. Further, in the third embodiment, the top view shape of the normal float part 42 is substantially rectangular, but as shown in FIG. 18A, the top view shape of the normal float part 42 of the present modification 4 is substantially circular. The normal float part 42 is easy to rotate around the rotation center float part 43. Further, as shown in FIGS. 18A and 18B, the normal float part 42 has the floats E in which the solar panel 50 are arranged and the floats 70 in which the wirings extending from each solar panel 50 are collected. A connection box (not shown) is installed in the float 70, and the wiring extending from each solar panel 50 is electrically connected to this connection box. That is, the connection box of the float 70 has a function of collecting the wires extending from each solar panel 50. A transmission line 71 is connected to the connection box of the float 70. The transmission line 71 has a function of electrically connecting the solar panel 50 and a power conditioner (not shown), and the electric power generated by the solar panel 50 is transmitted to the power conditioner via the transmission line 71. Although the power conditioner is provided on the water in the fourth modification, it may be provided on the land. The transmission line 71 may be pulled into the water by passing the transmission line 71 through the gap between the floats E of the normal float part 42. Or, the transmission line 71 may be pulled into the water by passing between the outer ring part 32 (see FIG. 13) and the connecting portion 44.

Figure 19A:
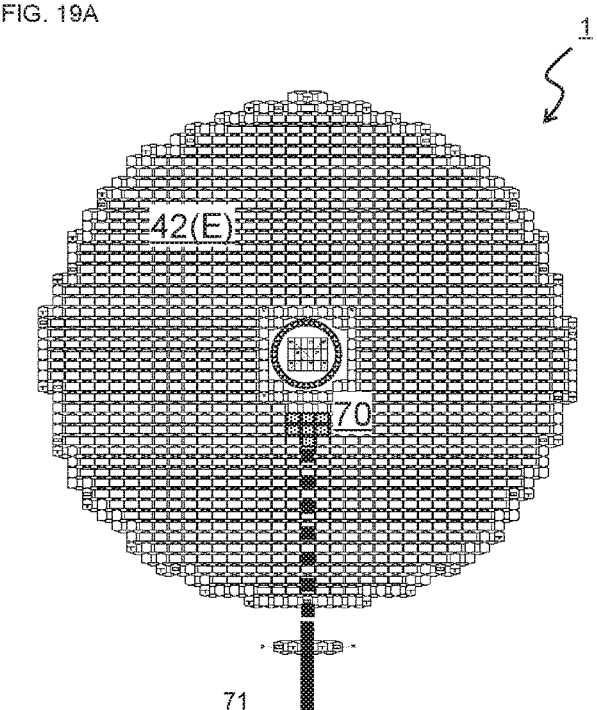
FIG. 19A is a top view showing a state in which the transmission line 71 of Modification 4 of the third embodiment is most loose in the underwater.
Figure 19B:
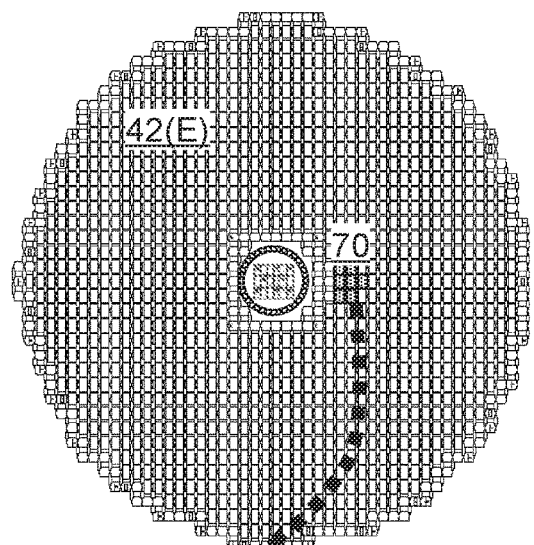
FIG. 19B is a top view showing a state in which the normal float part shown in FIG. 19A is rotated 90 degrees counterclockwise.
Figure 19C:
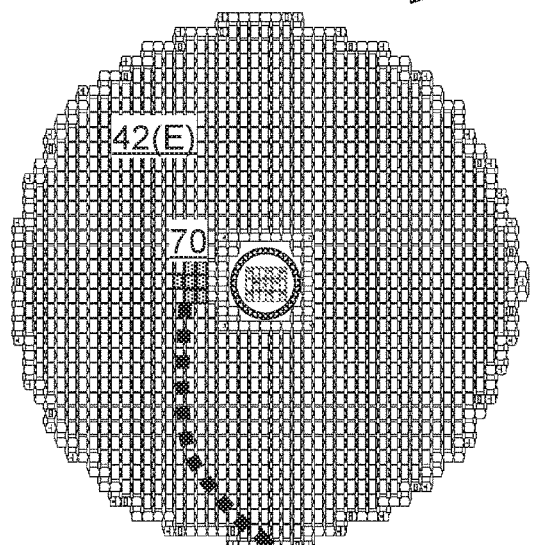
FIG. 19C is a top view showing a state in which the normal float part shown in FIG. 19A is rotated 90 degrees clockwise.

When the normal float part 42 rotates around the rotation center float part 43, the transmission line 71 also moves with the normal float part 42. FIGS. 19A to 19C, the solid line corresponding to the transmission line 71 indicates that the transmission line 71 is provided above the water surface. The broken line corresponding to the transmission line 71 indicates that the transmission line 71 is provided below the water surface. In the state shown in FIG. 19A, the transmission line 71 is slack below the surface of the water because the distance between the float 70 and the land side (power conditioner) is the shortest. On the other hand, in the states shown in FIGS. 19B and 19C, the distance between the float 70 and the land side (power conditioner) becomes longer, and the degree of slackness of the transmission line 71 becomes smaller.

Here, if the length of the transmission line 71 is too short, the rotation of the normal float part 42 is disturbed. And if the length of the transmission line 71 is too long, the transmission line 71 does not smoothly follow the rotation of the normal float part 42. Thus, the length of the transmission line 71 is set so as to secure an appropriate margin. Moreover, when the normal float part 42 is rotated, the movement amount of the transmission line 71, in the case where the float 70 is arranged on the inner side (center side) of the normal float part 42, is larger than that of the case where the float 70 is arranged on the outer side of the normal float part 42. Thus, as shown in FIGS. 18A and 18B, the float 70 is arranged on the inner side (center side) of the normal float part 42. As a result, even if the normal float part 42 rotates, the movement of the transmission line 71 is suppressed, so it is easy to set the length of the transmission line 71 to the length that secures the appropriate margin as described above. As a result, the transmission lines 71 are prevented from being entangled with each other, and the movement of the transmission lines 71 is suppressed, so that the deterioration of the transmission lines 71 is suppressed.

5. CONCLUSION

As described above, according to the present embodiment provides the float manufactured at a lower cost than the conventional one while maintaining the supporting stability of the solar panel, and the float assembly including the float. The present embodiment also provides the float assembly including the float more suitable for use on water and equipped with measure against wind pressure. And the present embodiment also provides the float assembly in which the wiring of the power cable is more organized.

Although various embodiments according to the present invention have been described, these are presented as examples and are not intended to limit the scope of the invention. The novel embodiment can be implemented in various other forms, and various omissions, replacements, and changes can be made without departing from the spirit of the invention. The embodiment and its modifications are included in the scope and gist of the invention. And the embodiment and its modifications are also included in the invention described in the claims and the scope equivalent thereto.

DESCRIPTION OF REFERENCE SIGNS

1: float assembly, 2: normal float part, 3: rotation center float part, 4: rotation wire, 5: winch, 6: winch, 7: shaft wire, 8: fixed part, 9: facilitation mechanism, 10: float, 10f: eaves-shaped end, 10r: eaves-shaped end, 11: supporting portion, 12: receiving portion, 13: securing metal fittings, 14: securing metal fittings, 15: side wall portion, 16: front surface wall, 17: back surface wall, 30: facilitation mechanism, 31: inner ring part, 31B: fixing member, 32: outer ring part, 32A: fixing member, 32B: fixing member, 33: interposition part, 34: roof portion, 35: partition part, 42: normal float part, 42A: base portion, 42B: hook portion, 42B1: fixed part, 42B2: arcuate part, 42a: adjustment float part, 42a1: base portion, 42a2: hook portion, 42a3: fixed part, 42a4: ring part, 43: rotation center float part, 43A: base portion, 43B: rail part, 44: connecting portion, 44A to 44D: side portion, 45: inner connecting portion, 45a: metal fittings, 46: outer connecting portion, 46a: metal fittings, 47: rotation wire, 47A: first wire, 47B: second wire, 48: tension generation mechanism, BD: block body, E: float, E1: concave portion, F1 to F7: float row, 50: solar panel, 51: front end, 52: rear end, 60: passage joint, 70: float, 71: transmission line, L: lake, PL: parting line

The invention claimed is:

1. A float assembly configured to float on water, comprising:
    a shaft wire extending from substantially a center of the float assembly toward underwater and configured so that tension is maintained;
    a normal float including a plurality of floats connected to one another; and
    a rotation center float moored by the shaft wire, wherein the float assembly is moored by the shaft wire and configured to be rotatable,
    the normal float is configured to independently rotate around the rotation center float.

2. The float assembly according to claim 1, wherein the rotation center float further includes a first tension generating mechanism,
    the shaft wire includes one end fixed in the underwater, and the first tension generating mechanism is configured to pull the shaft wire to maintain the tension of the shaft wire.

3. The float assembly according to claim 2, wherein the first tension generating mechanism is a first winch configured to wind the shaft wire.

4. The float assembly according to claim 1, further comprising
    a facilitation mechanism provided at a boundary between the normal float and the rotation center float.

5. The float assembly according to claim 1, wherein the rotation center float is provided on a side of a bottom of the water than the normal float.

6. The float assembly according to claim 1, further comprising
    a water level sensor, wherein
    the float assembly is configured to adjust length and the tension of the shaft wire based on a water level detected by the water level sensor.

7. The float assembly according to claim 1, further comprising
    a rotation wire, wherein
    the rotation wire is configured to connect a rotation float to a land, and the rotation float is a part of the float assembly, and
    the float assembly is configured to rotate when the rotation wire is pulled.

8. The float assembly of claim 7, wherein
    the float assembly has a rectangular shape as a whole,
    the rotation float is located at an apex of the rectangular shape,
    a second tension generating mechanism configured to pull the rotation wire is provided in at least one of the rotation float and the land,
    the float assembly is configured to rotate when the rotation wire is pulled by the second tension generating mechanism.

9. The float assembly according to claim 8, wherein
    the second tension generating mechanism is a second winch configured to wind the rotation wire.

10. The float assembly according to claim 7, further comprising
    a wind speed sensor, wherein
    the float assembly is configured to lengthen at least one of the shaft wire and the rotation wire to release the tension when the wind speed sensor detects a predetermined wind speed or higher.

11. A float assembly configured to float on water, comprising:
    a normal float;
    a rotation center float;
    a facilitation mechanism provided between the normal float and the rotation center float so that the normal float rotates around the rotation center float independently of the rotation center float; and
    a rotation wire, wherein
    the normal float is configured to rotate around the rotation center float when the rotation wire is pulled.

12. The float assembly according to claim 11, wherein
    the facilitation mechanism includes an inner ring part, an outer ring part, and an interposition part,
    the rotation center float is arranged in the inner ring part,
    the normal float is arranged outside the outer ring part, and the outer ring part is configured to rotate together with the normal float,
    the interposition part is arranged between the inner ring part and the outer ring part.

13. The float assembly according to claim 12, wherein
    the facilitation mechanism includes a roof portion,
    the roof portion is arranged on an upper side of the interposition part, and is fixed to the inner ring part or the outer ring part.

14. The float assembly according to claim 12, wherein
    the inner ring part is directly or indirectly connected to the rotation center float,
    the outer ring part is directly or indirectly connected to the normal float,
    the inner ring part, the interposition part, and the outer ring part are independently provided.

15. The float assembly according to claim 11, further comprising
    a plurality of the normal floats, wherein
    the rotation wire is hooked on the normal float which is arranged on an outer side among the plurality of normal floats.

16. A float assembly configured to float on water, comprising:
    a normal float;
    a rotation center float; and
    a facilitation mechanism provided between the normal float and the rotation center float so that the normal float rotates around the rotation center float independently of the rotation center float, wherein
    the facilitation mechanism includes an inner ring part, an outer ring part, and an interposition part,
    the rotation center float is arranged in the inner ring part,
    the normal float is arranged outside the outer ring part, and the outer ring part is configured to rotate together with the normal float,
    the interposition part is arranged between the inner ring part and the outer ring part.

* * * * *